US007293139B2

(12) United States Patent
Nishimoto et al.

(10) Patent No.: US 7,293,139 B2
(45) Date of Patent: Nov. 6, 2007

(54) DISK ARRAY SYSTEM GENERATING A DATA GUARANTEE CODE ON DATA TRANSFERRING

(75) Inventors: Akira Nishimoto, Sagamihara (JP);
Naoto Matsunami, Hayama (JP);
Masahiko Sato, Odawara (JP); Hidemi Baba, Odawara (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 10/959,982

(22) Filed: Oct. 8, 2004

(65) Prior Publication Data

US 2006/0026345 A1 Feb. 2, 2006

(30) Foreign Application Priority Data

Jul. 28, 2004 (JP) ............................. 2004-220025

(51) Int. Cl.
*G06F 12/08* (2006.01)
(52) U.S. Cl. ........................... 711/114; 711/113; 711/3; 711/217; 711/220; 711/203; 714/768
(58) Field of Classification Search ................ 711/114, 711/113, 4, 3, 203, 123, 163, 220, 217; 714/15, 714/768
See application file for complete search history.

(56) References Cited

U.S. PATENT DOCUMENTS 5,787,460 A * 7/1998 Yashiro et al. .............. 711/114

6,606,715 B1 * 8/2003 Kikuchi ........................ 714/15
2005/0055522 A1 * 3/2005 Yagi ........................... 711/163
2005/0114574 A1 * 5/2005 Okamoto et al. ............. 710/74

FOREIGN PATENT DOCUMENTS

JP 2000-347815 12/2000

* cited by examiner

*Primary Examiner*—Reginald Bragdon
*Assistant Examiner*—Victor W. Wang
(74) *Attorney, Agent, or Firm*—Antonelli, Terry, Stout & Kraus, LLP.

(57) ABSTRACT

To correctly generate LAs even when out-of-order occurs. In a disk array system according to the present invention, a control unit includes: a host input/output unit that exchanges data and a control signal with a host connected to a disk array system; a disk input/output unit that exchanges data and a control signal with a disk; a cache memory that temporarily stores the data during transfer between the host input/output unit and the disk input/output unit in units of segments that are each formed by a plurality of blocks having a predetermined size; an MPU that controls an operation of the control unit by executing a control program; and a cache controller that controls input/output of the data into/from the cache memory, and the host input/output unit transfers, to the cache controller, transfer information containing the guarantee codes of the first blocks of the segments relating to the data transfer.

2 Claims, 19 Drawing Sheets

| TAG NUMBER 801 | COMMAND FIRST BLOCK LA 802 | COMMAND FIRST BLOCK BELONGING SEGMENT FIRST LA (LA_FIRST_SEG) 803 | LUN 804 | TRANSFER ADDRESS 805 |
|---|---|---|---|---|
| 0 | | | | |
| 1 | | | | |
| 2 | | | | |
| ... | ... | | ... | ... |

HOST-SIDE LA INFORMATION STORAGE UNIT 123

| # | COMMAND FIRST BLOCK LA 902 (802) | COMMAND FIRST BLOCK BELONGING SEGMENT FIRST LA (LA_FIRST_SEG) 903 (803) | LUN 904 (804) | CHANNEL NUMBER 905 | TAG NUMBER 906 (801) | LA VALIDITY INFORMATION 907 | TRANSFER ADDRESS 908 (805) |
|---|---|---|---|---|---|---|---|
| 0 | | | | | | | |
| 1 | | | | | | | |
| 2 | | | | | | | |
| ... | ... | ... | ... | ... | ... | ... | ... |

HOST INFORMATION HOLDING UNIT 114

DISK ARRAY SYSTEM GENERATING A DATA GUARANTEE CODE ON DATA TRANSFERRING

CLAIM OF PRIORITY

The present application claims priority from Japanese application P2004-220025 filed on Jul. 28, 2004, the content of which is hereby incorporated by reference into this application.

BACKGROUND

This invention relates to a disk array system, in particular, a technique for generating a data guarantee code.

A disk array system adopts a RAID (Redundant Arrays of Inexpensive Disks) structure where multiple disk drives are arranged in an array, in which read requests (data reading requests) and write requests (data writing requests) from hosts are processed at high speed through parallel operations of the disk drives, and improved reliability is achieved through addition of redundant data before storage into the disk drives.

In the disk array, when a write request is received from a host, data received from the host is temporarily stored in a cache and then is written into the disk drives in parallel. On the other hand, when a read request is received from a host, data is read from the disk drives in parallel, is stored in the cache, and is transferred from the cache to the host.

SUMMARY

In the disk array adopting the RAID structure, in order to make it possible to restore data in the event of occurrence of a failure in the disk drives, redundant data is saved in the disk drives. In addition, it is known that, for the sake of guarantee correctness of the data stored in the disk drives, a data guarantee code be added to each logical data block. As a method of adding the data guarantee code, for instance, a technique is proposed in JP 2000-347815 A with which a host input/output means exchanges data with a host and a cache according to a transfer list containing an LA that an MPU has created and, at the time when data is exchanged between the host input/output means and the cache, an LA holding means in a host information holding means acquires and holds an LA and an LA addition means adds the LA stored in the LA holding means to the data to be written into the cache.

In the conventional disk array system described above, in the case of the continuous transfer of multiple logical data blocks, the LA adding means adds an LA to each logical data block by incrementing an LA value fetched into the LA holding means by means of a counter.

When data is lost during data transfer between the host input/output units and the host, however, the lost data is re-read from the cache and is re-transmitted, so that there occurs "out-of-order" where the order of logical data blocks is changed and transfer is performed in the changed order. In this case, when LAs are created by counting the amount of transferred data like in the conventional case, it becomes impossible to generate correct LAs and there occur LA errors in LA check. For instance, in the case of iSCSI, the out-of-order occurs when packets lost on a network are re-transmitted.

It is therefore an object of an embodiment of this invention to correctly generate LAs even when out-of-order occurs. A disk array system according to the present invention includes: a plurality of disk drives on which data is read and written, and a control unit that controls the input/output of the data into/from the plurality of disk drives based on a data input/output request from a host coupled to the disk array system. The control unit includes: a host input/output unit that exchanges the data and a control signal with the host, a disk input/output unit that exchanges the data and a control signal with the plurality of disk drives, a cache memory that temporarily stores the data during transfer between the host input/output unit and the disk input/output unit in units of segments that are each formed by a plurality of blocks having a predetermined size, an MPU that controls an operation of the control unit by executing a control program, and a cache controller that controls input/output of the data into/from the cache memory. The host input/output unit transfers, to the cache controller, transfer information including the guarantee codes of the first blocks of the segments relating to the data transfer.

According the embodiment of to this invention, each guarantee code is generated based on information transferred from the host input/output unit to the cache controller, so that even in the case of occurrence of out-of-order where the order of logical data blocks is changed and transfer is performed in the changed order, it becomes possible to correctly generate guarantee codes. Also, it becomes possible to perform LA check as appropriate at the time of data reading.

BRIEF DESCRIPTION OF THE DRAWINGS

The present invention can be appreciated by the description which follows in conjunction with the following figures, wherein:

FIG. 7 is a schematic diagram of a host-side LA information storage unit according to the first embodiment of this invention.

FIG. 8 is a schematic diagram of a host information holding unit according to the first embodiment of this invention.

DETAILED DESCRIPTION OF THE PREFERRED EMBODIMENTS

Embodiments of this invention will now be described with reference to the accompanying drawings.

First Embodiment

Figure 1:
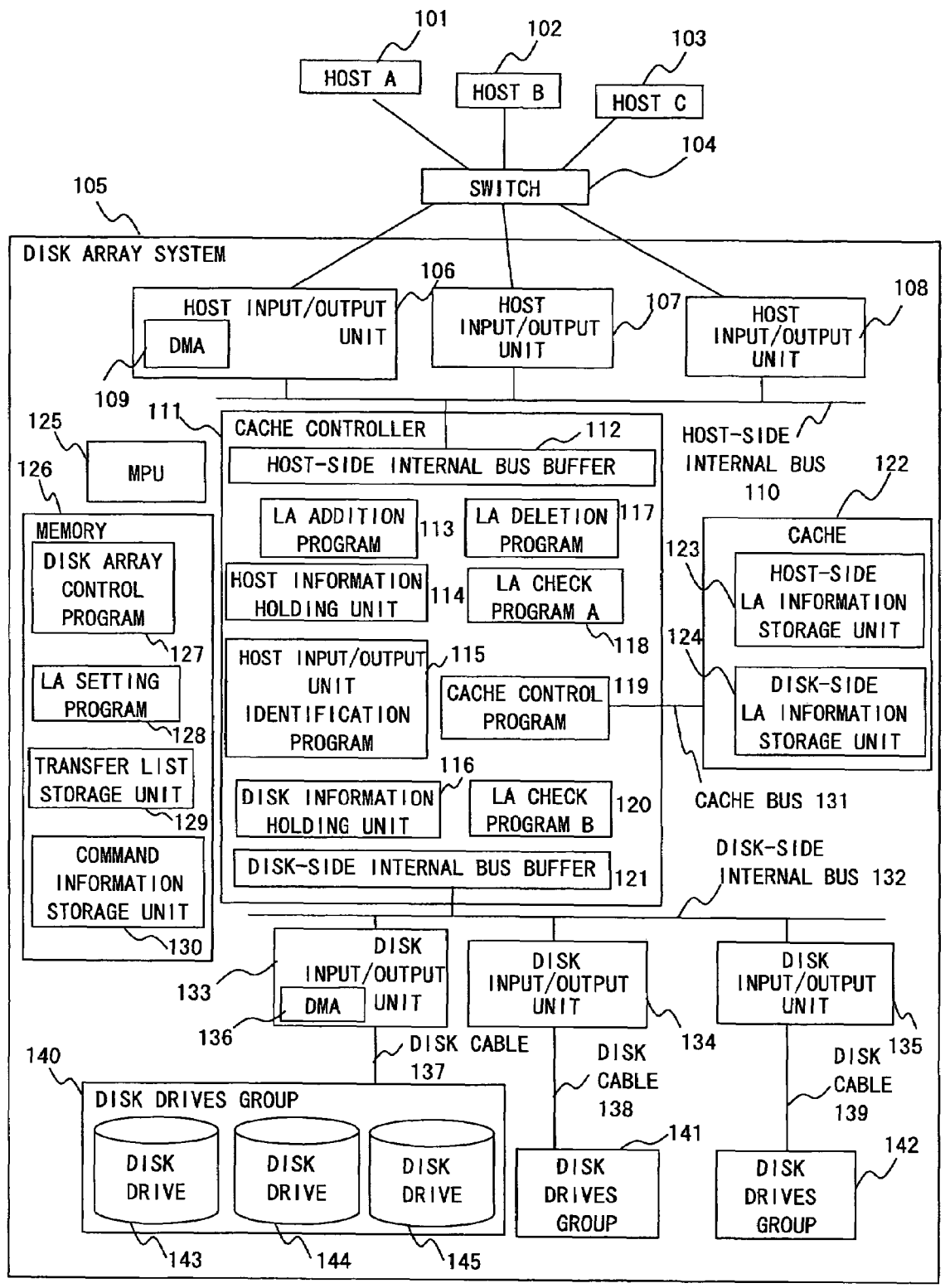
FIG. 1 is a block diagram showing a configuration of a disk array system according to a first embodiment of this invention.

FIG. 1 is a block diagram showing a configuration of a disk array system according to a first embodiment of this invention.

Hosts 101, 102, and 103 are each a computer device including a CPU, a memory, a storage units, an interface, an input units, and a display units. Application programs are run on these hosts. The application programs enable the usage of a database service, a Web service, and the like by utilizing data provided from a disk array system 105. The hosts 101, 102, and 103 are connected to host input/output units 106, 107, and 108 in the disk array system 105 through host cables and a bus switch 104. It should be noted that as to the hosts 101, 102, and 103, it is sufficient that at least one host is provided.

A SAN (Storage Area Network) is realized by the host cables and the switch 104 through which the hosts 101, 102, and 103 and the disk array system 105 are connected to each other. The SAN is a network where it is possible to communicate using a protocol, such as Fibre Channel or iSCSI (internet SCSI), that is suited for data transfer. The protocol used in the SAN is determined by the host 101 and the like and the host input/output unit 106 and is identified by a host input/output unit identification program 115.

The disk array system 105 includes the host input/output units 106, 107, and 108, disk input/output units 133, 134, and 135, disk drives groups 140, 141, and 142, a cache 122, an MPU 125 taking the overall control of the disk array, a memory 126, and a cache controller 111.

The host input/output units 106, 107, and 108 transfer data between the hosts 101, 102, and 103 and the cache controller 111 and are connected to the cache controller 111 through a host-side internal bus 110. The host-side internal bus 110 is, for instance, a PCI bus and is capable of transferring data. The host input/output unit 106 includes a DMA (Direct Memory Access) controller 109 that transfers data on the host-side internal bus 110. It should be noted that the DMA controller 109 is also capable of accessing the memory 126.

The host input/output units 107 and 108 each have the same function as the host input/output unit 106. It should be noted that as to the host input/output units 106, 107, and 108, it is sufficient that at least one host input/output unit is provided.

The disk drives groups 140, 141, and 142 are each formed by at least one disk drives. For instance, the disk drives group 140 is formed by disk drives 143, 144, and 145. It should be noted that as to the disk drives groups 140, 141, and 142, it is sufficient that at least one disk drives group is provided.

The disk input/output units 133, 134, and 135 transfer data between the disk drives group 140 and the cache controller 111 and are connected to the disk drives group 140 through a disk cable 137. Also, the disk input/output unit 133 is connected to the cache controller 111 through a disk-side internal bus 132. It is possible to use Fibre Channel, for instance, as the disk-side internal bus 132. The disk input/output unit 133 includes a DMA controller 136 that transfers data on the disk-side internal bus 132. The DMA controller 136 is also capable of accessing the memory 126.

Similar to the disk input/output unit 133, the disk input/output units 134 and 135 are respectively connected to the disk drives groups 141 and 142 through disk cables 138 and 139 and are connected to the cache controller 111 through the disk-side internal bus 132. The disk input/output units 134 and 135 each have the same function as the disk input/output unit 133 as well. It should be noted that as to the disk input/output units 133, 134, and 135, it is sufficient that at least one disk input/output unit is provided.

The cache controller 111 includes a host-side internal bus buffer 112, an LA addition program 113, a host information holding unit 114, a host input/output unit identification program 115, a disk information holding unit 116, an LA deletion program 117, an LA check program A 118, a cache control program 119, an LA check program B 120, and a disk-side internal bus buffer 121.

The host-side internal bus buffer 112 temporarily stores data transferred between the host input/output units 106, 107, and 108 and the cache 122. On the other hand, the disk-side internal bus buffer 121 temporarily stores data transferred between the disk input/output units 133, 134, and 135 and the cache 122.

The LA addition program 113 adds LAs to data to be transferred from the host input/output units 106, 107, and 108 to the cache 122 (this operation will be described in detail later with reference to FIG. 3).

The host information holding unit 114 stores host transfer information parameters based on an acquired host-side internal bus transfer list (see FIG. 6) at the time when data is transferred between the host input/output units 106, 107, and 108 and the cache 122 (this configuration will be described in detail later with reference to FIG. 8).

The host input/output unit identification program 115 identifies the communication protocol used by the host input/output unit 106. When the host input/output unit identification program 115 judges that the communication protocol used by the host input/output unit 106 is iSCSI, it is understood that there is a possibility that out-of-order will occur in which the transfer order of logical data blocks changes.

The disk information holding unit 116 stores disk transfer information parameters based on an acquired disk-side internal bus transfer list at the time when data is transferred between the disk input/output units 133, 134, and 135 and the cache 122. The disk information holding unit 116 includes an LA holding unit, an LUN holding unit, a channel number holding unit, a disk number holding unit, a tag number holding unit, an LA validity information holding unit, and a transfer address holding unit.

The LA holding unit holds LA expected values. The LUN holding unit holds the logical unit numbers (LUNs) of the disk array as viewed from the host side. The channel number holding unit holds the channel numbers for identifying the disk input/output units 133, 134, and 135 used for transfer. The disk number holding unit holds disk numbers for identifying disk drives which concerning to transfer requests. The tag number holding unit holds tag numbers for identifying commands with respect to the disk drives. The LA validity information holding unit holds LA validity information for identifying whether LA addition, check, or deletion is to be performed with respect to logical data blocks. The transfer address holding unit holds addresses in the cache 122 for transfer.

The LA deletion program 117 deletes LAs added to data to be transferred from the cache 122 to the host input/output units 106, 107, and 108 at the time of data reading from the disk array system 105 to the host 101 or the like (at the time of disk array read). To that end, the LA deletion program 117 includes a counter and a buffer value deletion program.

At the time of disk array read, data transferred from the cache 122 by the cache control program 119 is temporarily stored in the host-side internal bus buffer 112. Then, the counter counts the number of pieces of data stored in the host-side internal bus buffer 112 and, when a result of this counting reaches a value for LA deletion, issues a notification to the buffer value deletion program. Each time a notification is received from the counter, the buffer value deletion program deletes an LA added to the data in the host-side internal bus buffer 112.

The LA check program A 118 compares each LA added to data to be transferred from the cache 122 to the host input/output units 106, 107, and 108 with an LA expected value generated based on the information stored in the host information holding unit 114, thereby checking whether both the LAs are identical to each other (this operation will be described in detail later with reference to FIG. 4).

The cache control program 119 controls the transfer of data between the cache controller 111 and the cache 122.

The LA check program B 120 compares each LA added to "data to be transferred" between the disk input/output units 133, 134, and 135 and the cache 122 with an LA expected value generated based on the information stored in the disk information holding unit 116, thereby checking whether both the LAs are identical to each other (this operation will be described in detail later with reference to FIG. 5).

In this embodiment, each unit of the cache controller 111 is achieved by a program (software), although the cache controller 111 may be realized by the circuit of an LSI (hardware).

The cache 122 is a memory in which data to be transferred between the host input/output unit 106 and the like and the disk input/output unit 133 and the like is temporarily stored in units of segments. In this embodiment, one block has a size of 512 bytes and one segment is formed by a fixed value of four blocks (2048 bytes). The cache 122 is connected to the cache controller 111 through a cache bus 131.

In the cache 122, a host-side LA information storage unit 123 and a disk-side LA information storage unit 124 are provided and the LAs of the first blocks of commands are stored.

The memory 126 stores programs and data that are required by the MPU to operate, and a disk array control program 127, an LA setting program 128, a transfer list storage unit 129, and a command information storage unit 130 are stored therein.

The disk array control program 127 controls the transfer of data in the disk array through processing by the MPU 125.

The LA setting program 128 controls the LA calculation, addition, check, and deletion in the cache controller 111.

In the transfer list storage unit 129, a host-side internal bus transfer list and a disk-side internal bus transfer list created by the MPU 125 are stored. The host input/output unit 106 and the like access the cache 122 based on the transfer lists stored in the transfer list storage unit 129. It should be noted that the transfer lists (segment information and the like) stored in the transfer list storage unit 129 are sent out to the host-side internal bus 110 and the disk-side internal bus 132 as address information (PCI addresses, for instance).

The command information storage unit 130 stores the contents of host write commands and host read commands received by the host input/output unit 106 and the like. The contents of each command stored therein are read by the MPU 125 in response to an interrupt issued by the host input/output unit 106 or the like.

Figure 2:
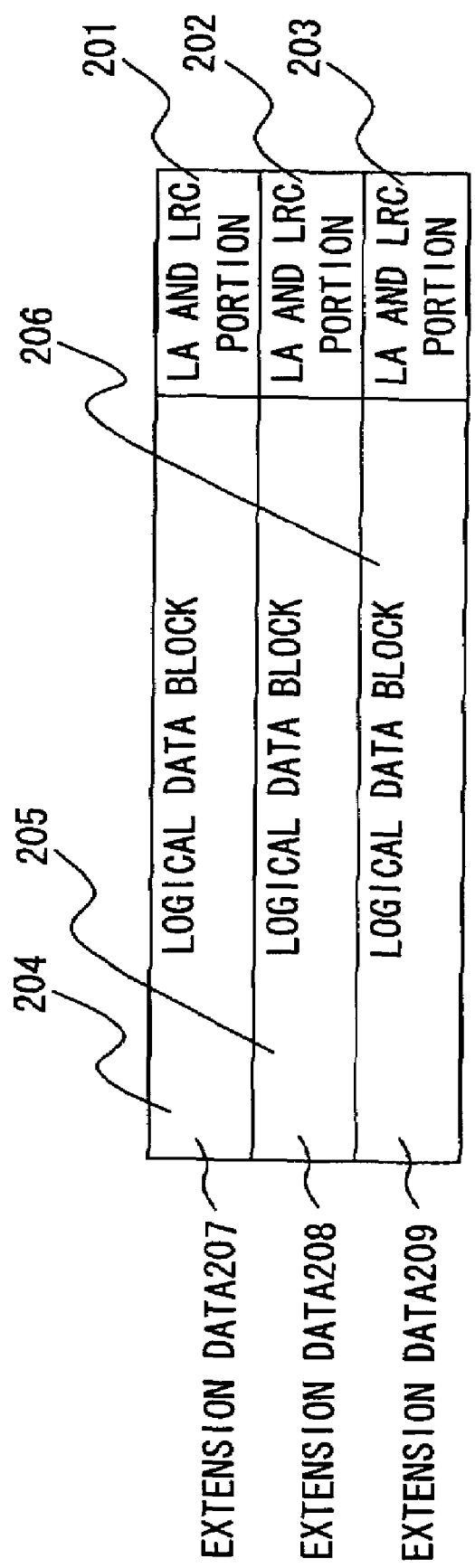
FIG. 2 is an explanatory diagram of a data storage format in a cache according to the first embodiment of this invention.

FIG. 2 is an explanatory diagram of a data storage format in the cache 122 in the first embodiment, and shows a storage state of data guarantee codes.

Logical data blocks 204, 205, and 206 are each a part of host data at the time of data transfer by the host 101 to the disk array system 105, with these logical data blocks 204, 205, and 206 being continuously arranged in this order. LA and LRC portions 201, 202, and 203 storing the data guarantee codes are added to the tail ends of the logical data blocks 204, 205, and 206, with the LA and LRC portions 201, 202, and 203 respectively corresponding to the logical data blocks 204, 205, and 206.

Extension data 207 is data where the logical data block 204 and the LA and LRC portion 201 are concatenated to each other. Extension data 208 is data where the logical data block 205 and the LA and LRC portion 202 are concatenated to each other. Extension data 209 is data where the logical data block 206 and the LA and LRC portion 203 are concatenated to each other. That is, the host data is data where the logical data block 204, the LA and LRC portion 201, the logical data block 205, the LA and LRC portion 202, the logical data block 206, and the LA and LRC portion 203 are continuously arranged in this order.

Each data guarantee code is composed of an LA (Logical Address) and an LRC (Longitudinal Redundancy Check). The LA is generated from two bytes of a logical unit number (LUN) and two bytes of a logical data block address (LBA). It is possible to improve the reliability of the system by adding LAs, with which it is possible to identify the addresses of logical data blocks that should be read/written, to respective pieces of logical block data and confirming that each read/write address is correct.

The LRC is data of four bytes obtained through the EXCLUSIVE-OR operation of each logical data block. It is possible to check a data bit error during data transfer in the disk array using the LRC, so that it becomes possible to improve the reliability of the system.

Figure 3:
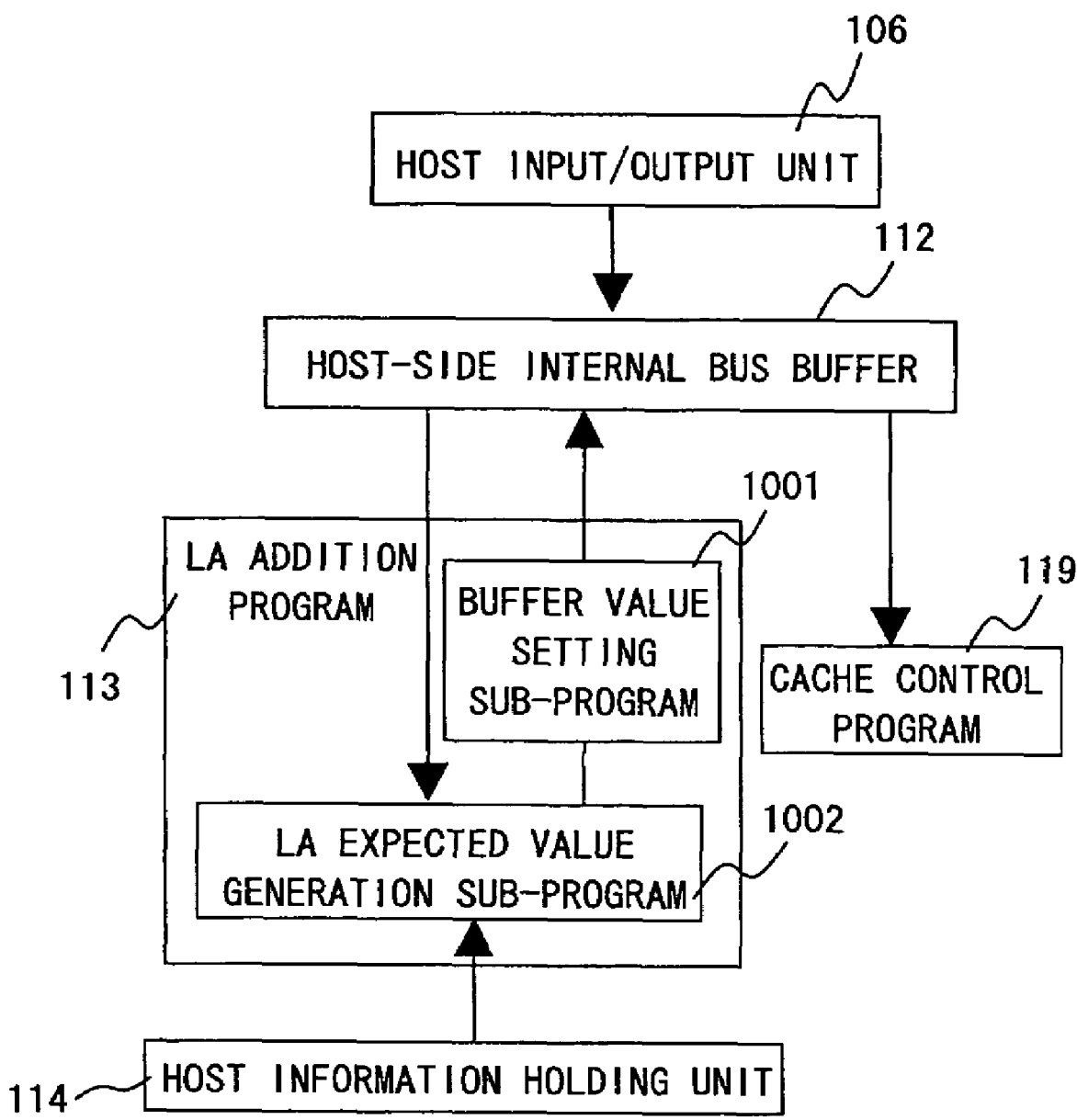
FIG. 3 is a functional block diagram of an LA addition program according to the first embodiment of this invention.

FIG. 3 is a schematic diagram of the LA addition program 113 in the first embodiment.

The LA addition program 113 includes a buffer value setting sub-program 1001 and an LA expected value generation sub-program 1002 and adds LAs to data to be transferred from the host input/output unit 106 or the like to the cache 122 at the time of disk array write.

When the host input/output unit 106 receives a write command and further receives write data from the host 101 or the like, the data transferred at the time of disk array write is stored in the host-side internal bus buffer 112. When the cache control program 119 instructs the host-side internal bus buffer 112 to read the data from itself, the host-side internal bus buffer 112 transmits a control signal to the LA expected value generation sub-program 1002. On detecting the control signal transmitted from the host-side internal bus buffer 112, the LA expected value generation sub-program 1002 generates an LA for each block using the information stored in the host information holding unit 114 and sends out the LA to the buffer value setting sub-program 1001.

The buffer value setting sub-program 1001 adds the LA to the data (logical data block 204) stored in the host-side internal bus buffer 112. After the addition of the LA, the data is further given an LRC and is transferred to the cache 122 by the cache control program 119.

Figure 4:
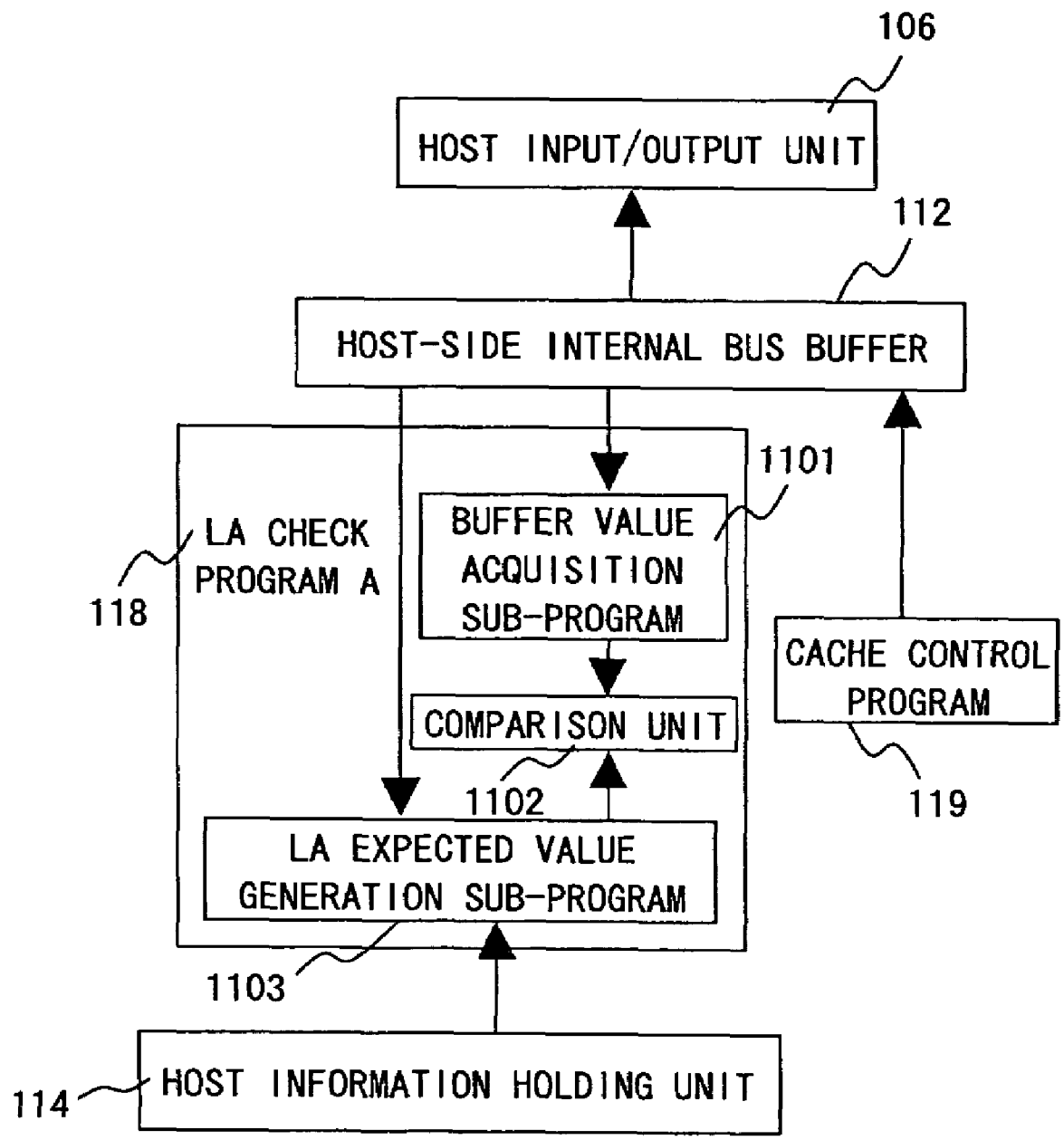
FIG. 4 is a functional block diagram of an LA check program A according to the first embodiment of this invention.

FIG. 4 is a schematic diagram of the LA check program A 118 in the first embodiment.

The LA check program A 118 includes a buffer value acquisition sub-program 1101, a comparison unit 1102, and an LA expected value generation sub-program 1103. At the time of disk array read, the LA check program A 118 compares each LA added to "data to be transferred" from the cache 122 to the host input/output unit 106 or the like with an expected LA, thereby checking whether both the LAs are identical to each other.

The logical data block 204 (512 bytes) that is data of one block transferred from the cache 122 by the cache control program 119 at the time of disk array read, is stored in the host-side internal bus buffer 112. Also, in the data of one block, the data guarantee code stored in the LA and LRC portion (8 bytes) is sent to the buffer value acquisition sub-program 1101.

The buffer value acquisition sub-program 1101 extracts the LA from the acquired data guarantee code and sends it out to the comparison unit 1102.

Also, after reading the data of one block from the cache 122, the host-side internal bus buffer 112 transmits a control signal to the LA expected value generation sub-program 1103. On detecting the control signal transmitted from the host-side internal bus buffer 112, the LA expected value generation sub-program 1103 generates an LA for the block based on the information stored in the host information holding unit 114 and sends it out to the comparison unit 1102.

The comparison unit 1102 makes a comparison, thereby checking whether the LA acquired from the LA expected value generation sub-program 1103 and the LA acquired from the buffer value acquisition sub-program 1101 are identical to each other. When it is found as a result of this comparison that these LAs do not coincide with each other, it is judged that any abnormality exists in the data read from the cache 122 and the LA check program 118 issues an error notification to the MPU 125. On the other hand, when both the LAs coincide with each other, it is judged that the data read from the cache 122 is normal and the host-side internal bus buffer 112 transfers the data to the host input/output unit 106.

Figure 5:
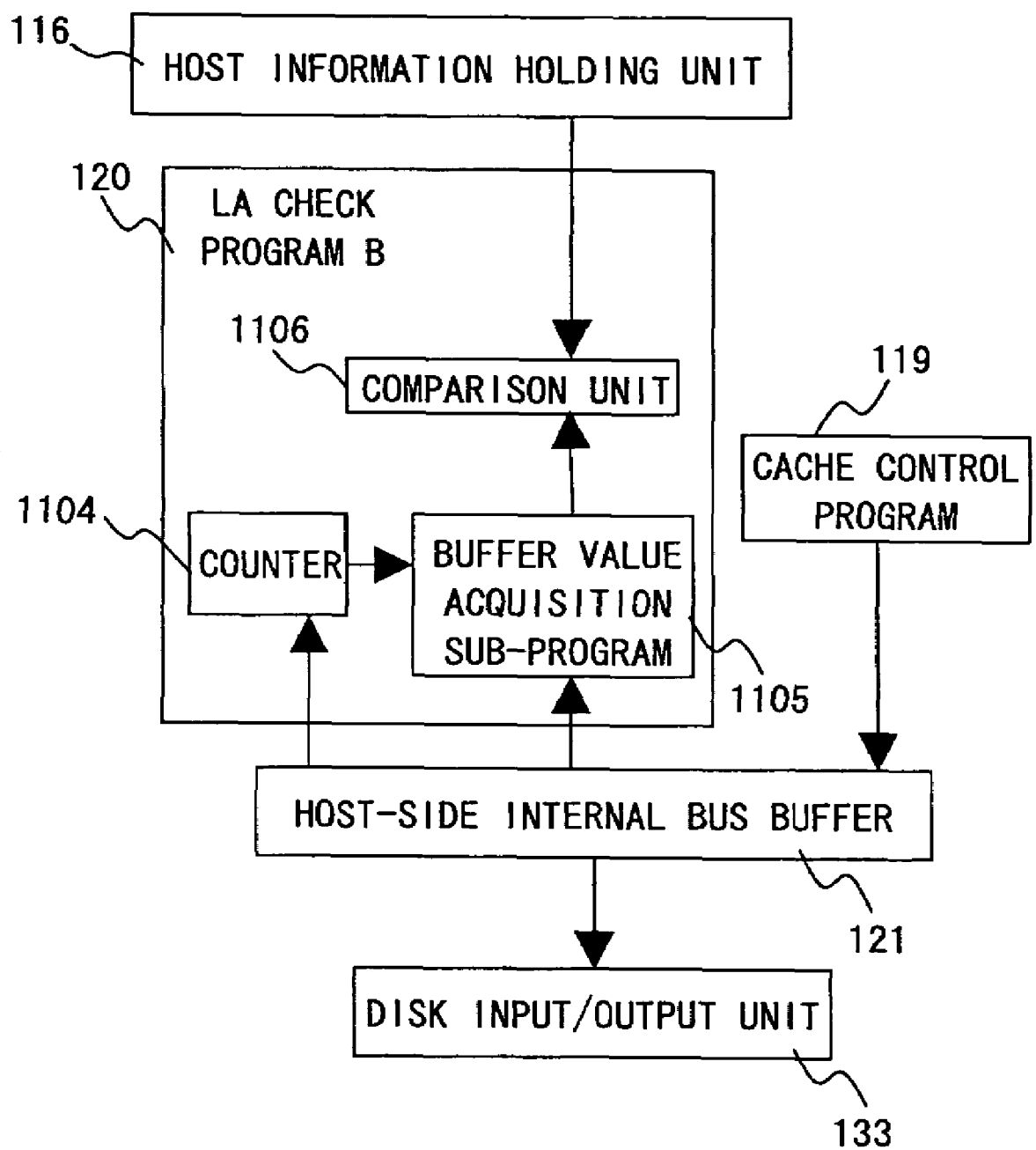
FIG. 5 is a functional block diagram of an LA check program B according to the first embodiment of this invention.

FIG. 5 is a schematic diagram of the LA check program B 120 in the first embodiment.

The LA check program B 120 includes a counter 1104, a buffer value acquisition sub-program 1105, and a comparison unit 1106. At the time of disk array read, the LA check program B 120 compares each LA added to data to be transferred from the disk input/output unit 133 or the like to the cache 122 with an expected LA, thereby checking whether both the LAs are identical to each other. Also, at the time of disk array write, the LA check program B 120 compares each LA added to data to be transferred from the cache 122 to the disk input/output unit 133 or the like with an expected LA, thereby checking whether both the LAs are identical to each other.

At the time of data writing from the host 101 or the like to the disk array system 105 (at the time of disk array write), data transferred from the cache 122 by the cache control program 119 is temporarily stored in the disk-side internal bus buffer 121. Also, at the time of disk array read, data transferred from the disk input/output unit 133 is buffered in the disk-side internal bus buffer 121.

The counter 1104 counts the number of pieces of data temporarily stored in the disk-side internal bus buffer 121 and, when a result of this counting reaches a count value for LA acquisition, issues a notification to the buffer value acquisition sub-program 1105. On receiving the notification from the counter, the buffer value acquisition sub-program 1105 acquires the LA added to the data in the disk-side internal bus buffer 121 and sends it out to the comparison unit 1106. The comparison unit 1106 acquires an LA from the LA holding unit of the disk information holding unit 116 and makes a comparison, thereby checking whether the acquired LA is identical to the LA sent from the buffer value acquisition sub-program 1105. When it is found as a result of this comparison that the LAs are not identical to each other, the LA check program B 120 issues an error notification to the MPU 125.

It should be noted that when multiple logical data blocks are continuously transferred, the LA check program B 120 compares LAs added to the data to be transferred between the disk input/output unit 133 or the like and the cache 122 with LA expected values generated through addition of the LA value acquired from the LA holding unit by means of the counter, thereby checking the LAs in succession.

In this manner, when data is transferred from the host 101 to the disk array system 105, logical data block addresses are specified for writing. At this time, when data is written into the cache 122 at the time of disk array write, a data guarantee code is added to each logical data block. It should be noted that at the time of reading the data from the cache 122 and writing into the disk drives 143, a check is made by comparing the data guarantee code added to the logical data block with a generated expected value of the data guarantee code.

Also, at the time of disk array read, when data is read from the disk drives 143 and is transferred to the cache 122 and when data read from the cache 122 is transferred to the host 101, a check is made by comparing a data guarantee code added to each logical data block with a generated expected value of the data guarantee code. The data guarantee code added to the logical data block is deleted at the time of transfer to the host 101, thereby returning the data to an original state. It should be noted that also at the time of reading data from the disk drives 143 and writing data into the cache 122, the data guarantee code is checked.

Figure 6:
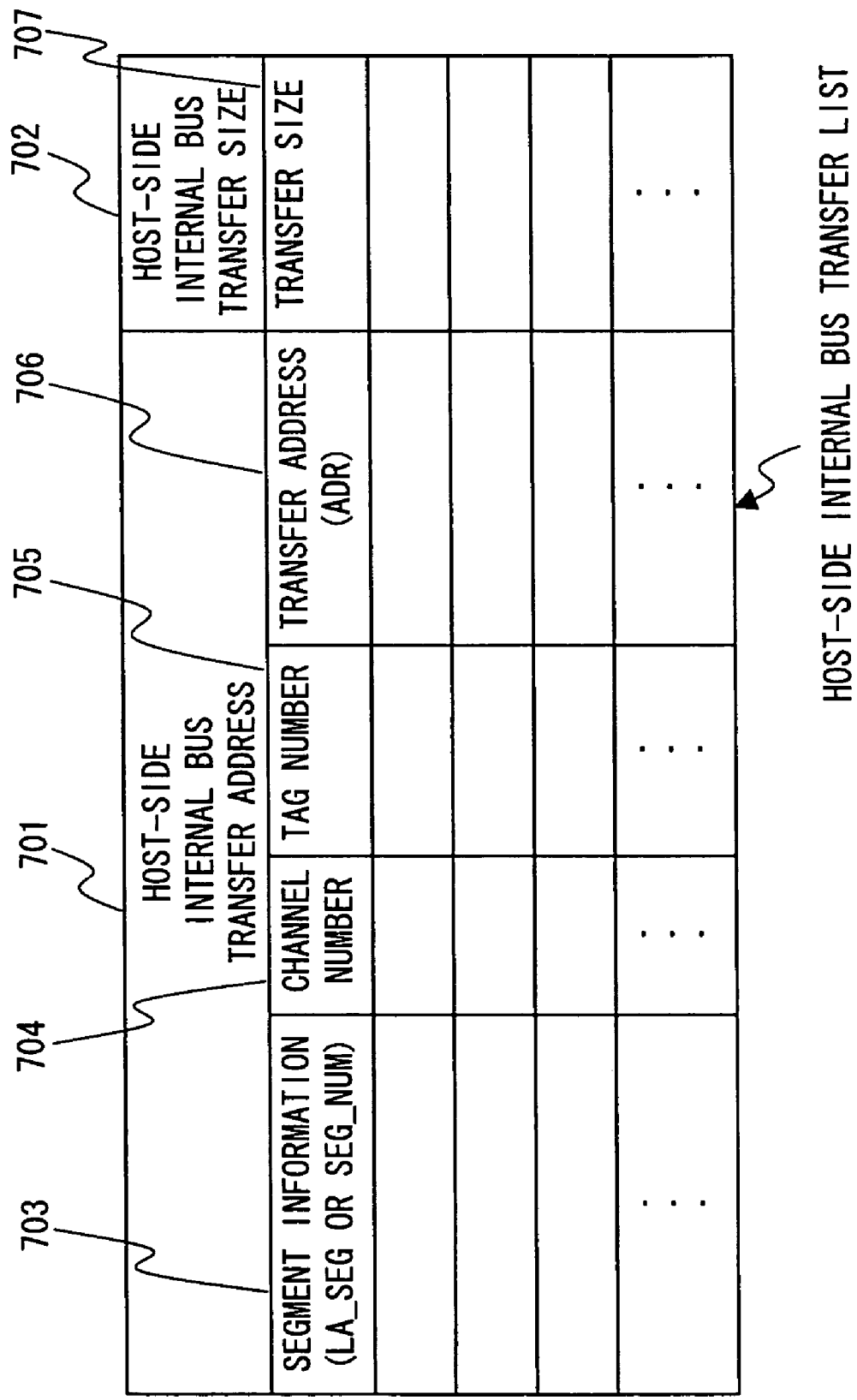
FIG. 6 is a schematic diagram of a host-side internal bus transfer list according to the first embodiment of this invention.

FIG. 6 is a schematic diagram of the host-side internal bus transfer list in the first embodiment.

The host-side internal bus transfer list is created by the MPU 125 and is stored in the transfer list storage unit 129.

The host-side internal bus transfer list is acquired by the host input/output unit 106 using the DMA controller 109 in order to transfer data. Also, the disk-side internal bus transfer list is acquired by the disk input/output unit 133 using the DMA controller 136 in order to transfer data.

It is possible for the host input/output units 106, 107, and 108 to transfer data by DMA controller using the host-side internal bus transfer list. Also, it is possible for the disk input/output units 133, 134, and 135 to transfer data by DMA controller using the disk-side internal bus transfer list. The cache controller 111 performs data transmission/reception according to each transfer command received from the host input/output unit 106, 107, or 108 or the disk input/output unit 133, 134, or 135. The host input/output unit 106 and the disk input/output unit 133 perform transfer list acquisition processing and data transfer processing. Consequently, no involvement by the MPU 125 is required until the data transfer is finished.

The host-side internal bus transfer list stores m (m is a natural number) entries named "host-side internal bus transfer address" 701 specifying addresses in the cache 122 and m entries named "host-side internal bus transfer size" 702 specifying the transfer sizes of data.

Each host-side internal bus transfer address entry 701 is composed of various fields named "segment information" 703, "channel number" 704, "tag number" 705, and "transfer address (ADR)" 706, with these fields giving host transfer parameters. Also, each host-side internal bus transfer size entry 702 is composed of a field named "transfer size" 707 giving the size of data to be transferred.

In the segment information field 703, the LA of a logical block among multiple logical blocks stored at the head of the segment in the cache (hereinafter referred to as the "segment first block LA (LA_SEG)") is stored. Aside from this, as will be described in a second embodiment, a serial number (SEG_NUM) expressing the location of a segment in a command may be stored in the segment information field 703. In the channel number (field) 704, the identification number of the host input/output unit 106 or the like that received a data input/output request is stored. In the tag number field 705, the identification number of a command issued by the host 101 or the like is stored, with the tag number 705 corresponding to a tag number 801 of the host-side LA information storage unit (see FIG. 7) and a tag number 906 of the host information holding unit (see FIG. 8). In the transfer address field 706, an address in the cache 122 that is the transfer source or transfer destination of data is stored.

On receiving the address stored in the transfer address field 706, the cache controller 111 identifies a corresponding command with reference to the tag number field 705 and reads corresponding LA information from the host-side LA information storage unit 123 of the cache 122. In the host-side LA information storage unit 123, the LA of the first block of the command is stored.

Here, there occurs no problem even when multiple host-side internal bus transfer lists and multiple disk-side internal bus transfer lists exist.

FIG. 7 is a schematic diagram of the host-side LA information storage unit 123 in the first embodiment.

The host-side LA information storage unit 123 is a table stored in the cache 122 by the MPU 125 and storing LA information concerning logical blocks to be transferred from the host input/output unit to the cache 122. The cache controller 111 acquires information necessary to obtain LA expected values with reference to this table based on the tag numbers specified on the transfer list. The information acquired by the cache controller 111 is held in the host information holding unit 114.

The host-side LA information storage unit 123 is a table including entries that are each composed of various fields named "tag number" 801, "command first block LA" (LA of the first block among multiple logical blocks transferred based on a command received from a host) 802, "command first block belonging segment first LA" (LA of a logical block at the head of a segment in the cache in which the first block of a command received from a host is stored) 803, an LUN 804, and a transfer address 805.

The tag number field 801 gives the identification number of a command issued by the host 101 or the like and is the same as the tag number field of the host-side internal bus transfer list (see FIG. 6). The number of the entries of the host-side LA information storage unit 123 is set equal to the number of commands that the disk array system 105 is capable of processing at the same time, with the respective entries being identified with the tag numbers 801.

Figure 14:
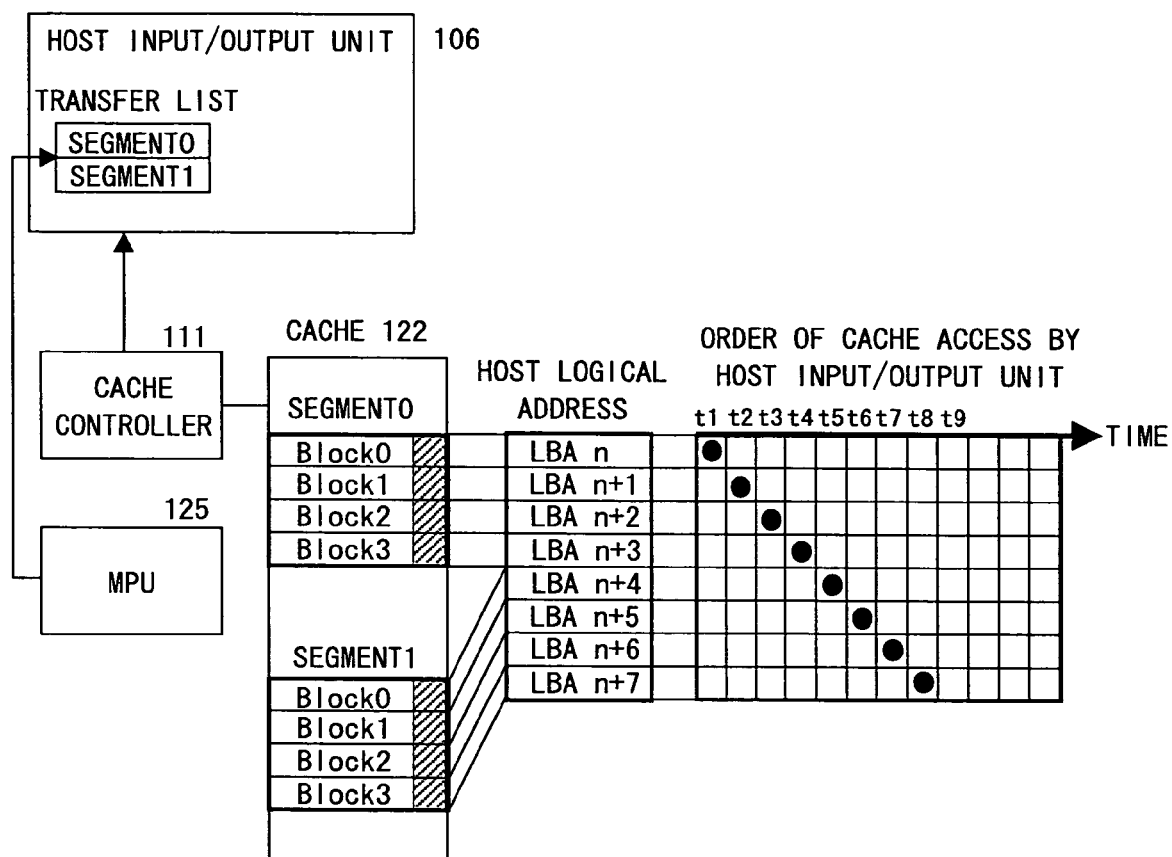
FIG. 14 is an explanatory diagram of cache access at the time of conventional in-order read/write.

In the case shown in FIG. 14, for instance, when the first block of a command is $LBA_{n+1}$, the LA of $LBA_n$ is held in the command first block belonging segment first LA field 803.

In each segment, logical blocks are concatenated to each other and are stored. The MPU 125 is capable of obtaining this value using a segment length, the address in the cache at which the first block of the command is stored, and the logical block.

In the LUN field 804, a logical unit number relating to data transfer (of the writing destination or reading source of data to be transferred) is held. In the transfer address field 805, a cache address that is the transfer destination or transfer source of data by a command is held.

FIG. 8 is a schematic diagram of the host information holding unit 114 in the first embodiment.

This host information holding unit 114 holds information stored at transfer addresses sent out from the host-side LA information storage unit 123 (see FIG. 7) and the host input/output unit 106 and the like to the host-side internal bus 110. Also, after transfer is started and an input/output address is acquired, an entry is generated by the cache controller 111.

Each entry in the host information holding unit 114 is composed of various fields named "entry number" 901, "command first block LA" 902, "command first block belonging segment first LA (LA_FIRST_SEG)" 903, "LUN" 904, "channel number" 905, "tag number" 906, "LA validity information" 907, and "transfer address" 908.

The command first block belonging segment first LA field 903 gives information used in the second embodiment to be described later. In the case shown in FIG. 14, for instance, when the first block of a command is $LBA_{n+1}$, the LA of $LBA_n$ is held therein.

The command first block LA 902, the command first block belonging segment first LA 903, the LUN 904, and the channel number 905 respectively correspond to the command first block LA 802, the command first block belonging segment first LA 803, the LUN 804, and the transfer address 805 of the host-side LA information storage unit 123 (see FIG. 7). These pieces of information are acquired from the host-side LA information storage unit 123.

In the LUN field 904, a logical unit number relating to data transfer (of the writing destination or reading source of data to be transferred) is held.

In the channel number field 905, the identification number of the host input/output unit 106 or the like that has received a data input/output request is held. In the tag number field 906, the identification number of a command issued by the host 101 or the like is held. In the LA validity information field 907, LA validity information for identifying whether the entry is valid or invalid, that is, whether LA addition, check, or deletion is to be performed with respect to logical data blocks is held. In the transfer address field 908, an address in the cache 122 relating to data transfer is held.

Figure 9:
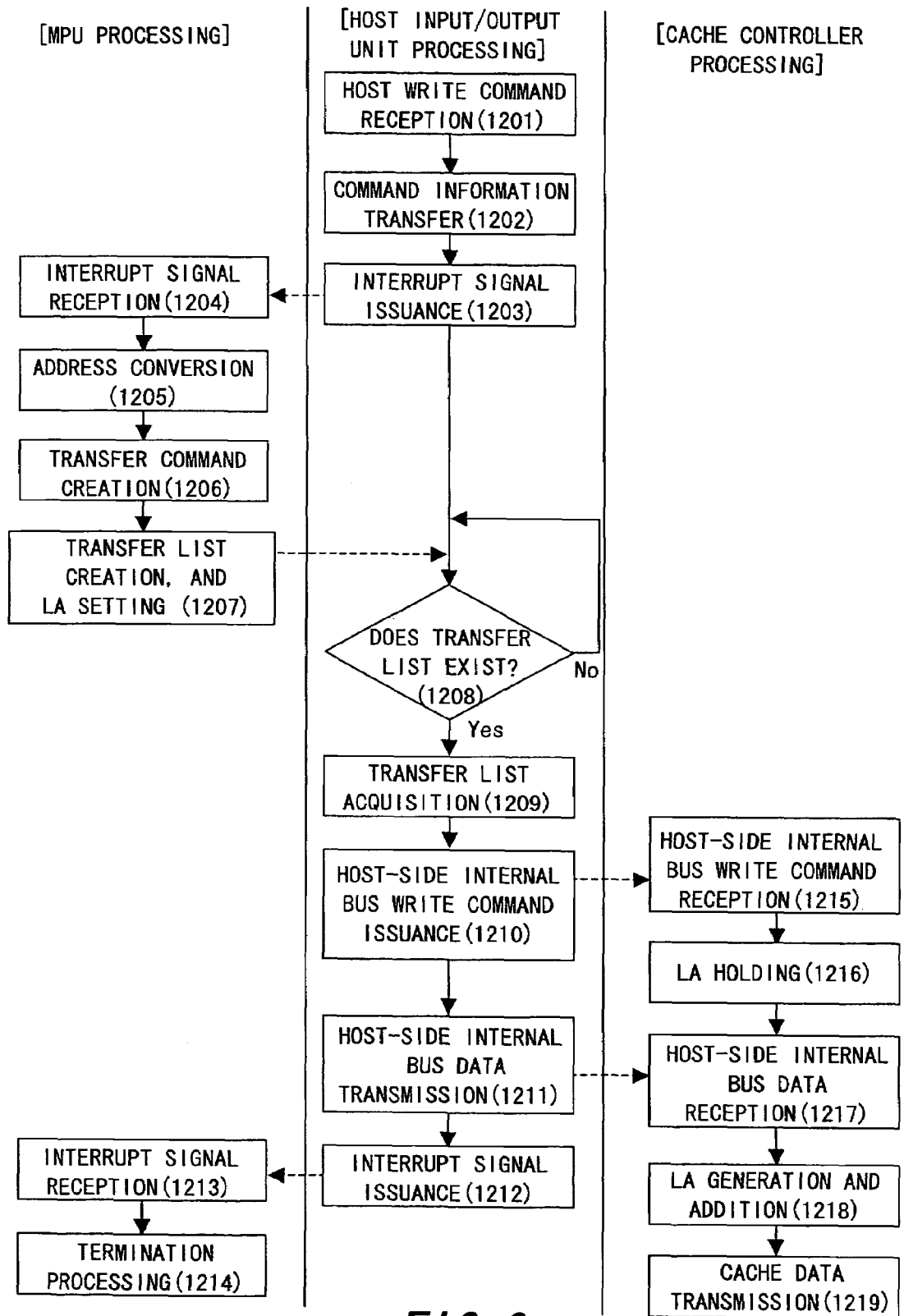
FIG. 9 is a sequential diagram of data transfer processing at the time of disk array write according to the first embodiment of this invention.

FIG. 9 is a sequential diagram of data transfer processing at the time of data writing from the host 101 to the disk array system 105 (at the time of disk array write) in the first embodiment.

First, in step 1201, when a data writing request is issued from the application program executed on the host 101 or the like, the host input/output unit 106 or the like receives the host read command. Then, in step 1202, the host input/output unit 106 or the like transfers the contents of the command to the command information storage unit 130 in the memory 126. Next, in step 1203, in order to have the MPU 125 create a transfer list, the host input/output unit 106 or the like issues an interrupt signal, thereby notifying the command reception.

In step 1204, the MPU 125 receives the interrupt signal. Then, in step 1205, the MPU 125 analyzes the contents of the host write command stored in the command information storage unit 130, extracts logical data block addresses from the command, and performs address conversion that is unique to the disk array where the logical data block addresses are converted into physical data block addresses. Then, in step 1206, the MPU 125 creates a transfer command for writing data to a cache. This transfer command is stored in the command information storage unit 130 and is used by the host input/output unit 106 (DMA controller 109). Then, in step 1207, LAs are generated from logical unit numbers and the logical data block addresses and an entry is added to the host-side LA information storage unit 123. Also, in this step, a host-side internal bus transfer list for dividing and transferring data sent from the host 101, to the cache 122, is created and is stored in the transfer list storage unit 129. Following this, the MPU 125 instructs the host input/output unit 106 to transfer.

After being instructed to transfer by the MPU 125, the host input/output unit 106 reads the transfer list 129 and stores read data corresponding to every entry of the list at specified cache addresses. First, in step 1208, it is judged whether a host-side internal bus transfer list is stored. When a result of this judgment is positive, the processing proceeds to step 1209 in which the host input/output unit 106 acquires the host-side internal bus transfer list from the transfer list storage unit 129 using the DMA controller 109. Following this, in step 1210, a write command (transfer command) with respect to the cache controller 111 is sent out to the host-side internal bus 110. This write command is a transfer command requesting the transfer of data stored in the cache and contains information on the transfer list as PCI addresses.

In step 1215, the cache controller 111 receives the write command (transfer command) from the host input/output unit 106. Then, in step 1216, the cache controller 111 acquires LAs from the host-side internal bus transfer addresses of the received write command (transfer command) and stores them in the host information holding unit 114.

After sending out the write command (transfer command) to the host-side internal bus 110 in step 1210, the host input/output unit 106 performs an operation in step 1211 where the DMA controller 109 sends out writing data to the host-side internal bus 110.

On receiving the writing data from the host input/output unit 106 in step 1217, the cache controller 111 generates LAs and adds the LAs to the data in step 1218 and transmits resultant data to the cache 122 in step 1219. In this invention, it does not matter whether the divided data is stored in physically continuous areas of the cache 122 or is stored in physically discontinuous areas thereof.

In step 1211, the host input/output unit 106 transmits the writing data to the host-side internal bus 110. Following this, when the data transfer is finished, the processing proceeds to step 1212 in which the host input/output unit 106 issues an interrupt signal to the MPU 125.

On receiving the interrupt signal in step 1213, the MPU 125 performs termination processing in step 1214.

In this manner, at the time of disk array write, when divided data is transferred, a data guarantee code is added to each logical data block, thereby improving the reliability as a system.

It should be noted that although not shown in the drawing, after the processing described above, the MPU 125 creates a transfer list for writing the divided data stored in the cache 122 into the disk drives 143. Then, the disk input/output unit 133 transfers the divided data from the cache 122 to the disk drives 143 according to the transfer list. It should be noted that the transfer list is created with respect to every disk drives to which the data is to be transferred.

Figure 10:
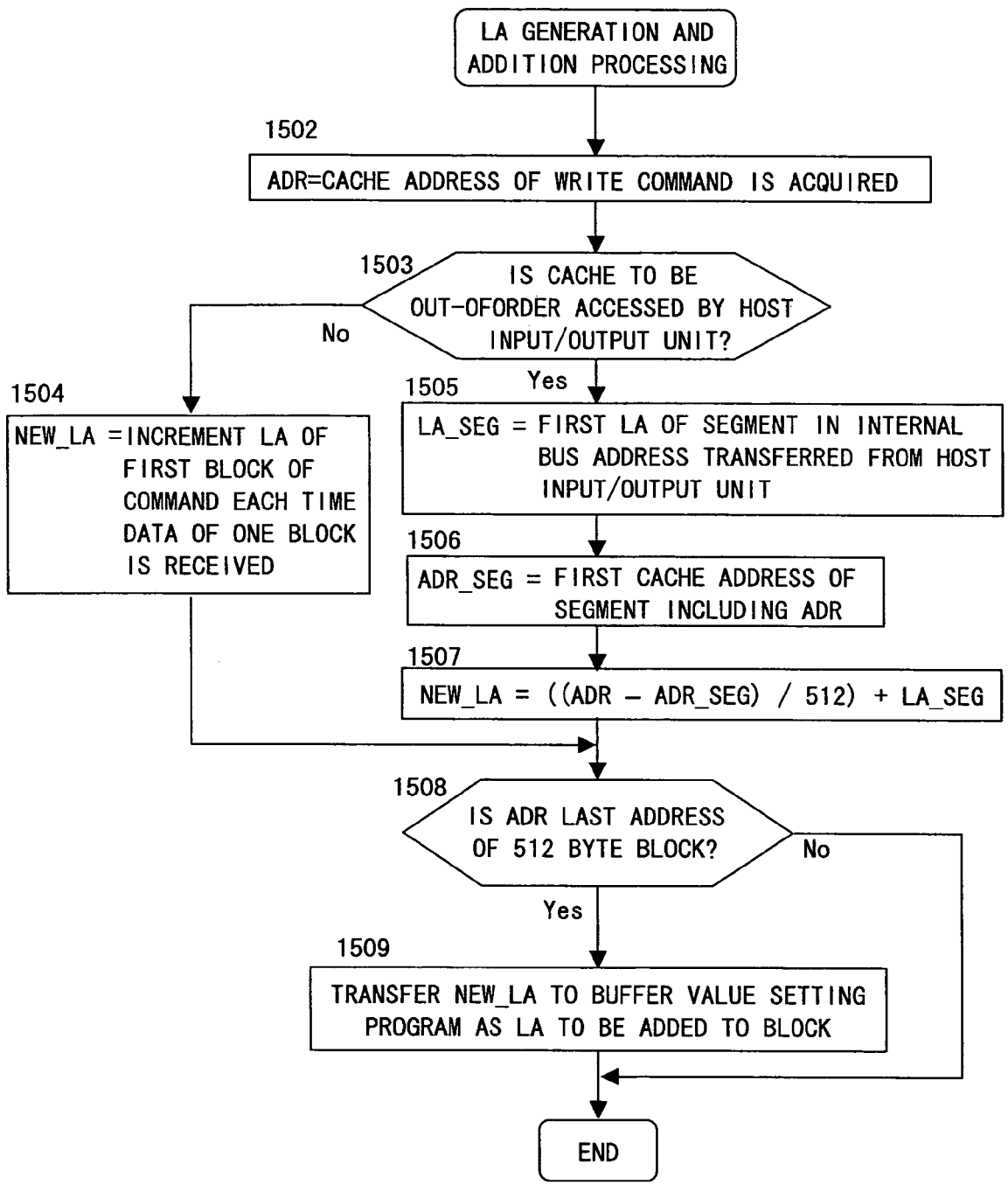
FIG. 10 is a flowchart of LA generation and addition processing according to the first embodiment of this invention.

FIG. 10 is a flowchart of the LA generation and addition processing (step 1218 in FIG. 9) in the first embodiment, and shows processing by the LA expected value generation sub-program 1002 of the LA addition program 113.

First, in step 1502, a cache address (ADR) that is a writing target is acquired from a write command (transfer command) received from the host input/output unit 106.

Following this, in step 1503, it is judged whether the cache is to be out-of-order accessed by the host input/output unit 106. This judgment is made by the host input/output unit identification program 115 based on a communication protocol used by the host input/output unit 106 to communicate with the host 101. For instance, when the host-side internal bus 110 uses Fibre Channel, it is judged that the out-of-order access will not occur. On the other hand, when iSCSI is used, it is judged that the out-of-order access will occur.

When it is judged in step 1503 that the out-of-order access to the cache will not occur, the processing proceeds to step 1504 in which each time data of one block is received, an LA is created by adding an address value corresponding to one block to the command first block LA 902 stored in the host information holding unit 114. Then, the processing proceeds to step 1508.

On the other hand, when it is judged in step 1503 that the out-of-order access to the cache will occur, the processing proceeds to step 1505 in which a segment first block LA in an internal bus address transferred from the host input/output unit 106 is set as a segment LA (LA_SEG). This segment LA is set in the segment information 703 of the host-side internal bus transfer list (see FIG. 6).

Then, in step 1506, the first cache address of the segment containing the cache address (ADR) is set as a segment address (ADR_SEG). More specifically, the ADR_SEG is obtained by dividing an address (PCI address) in the host-side internal bus 110 by a block length (512 bytes).

Then, in step 1507, an LA (NEW_LA) is calculated by equation (1)

$$NEW\_LA=((ADR-ADR\_SEG)/512)+LA\_SEG \qquad (1)$$

It should be noted that at this time, when a reminder is obtained from "((ADR−ADR_SEG)/512)", only a quotient is used.

Figure 11:
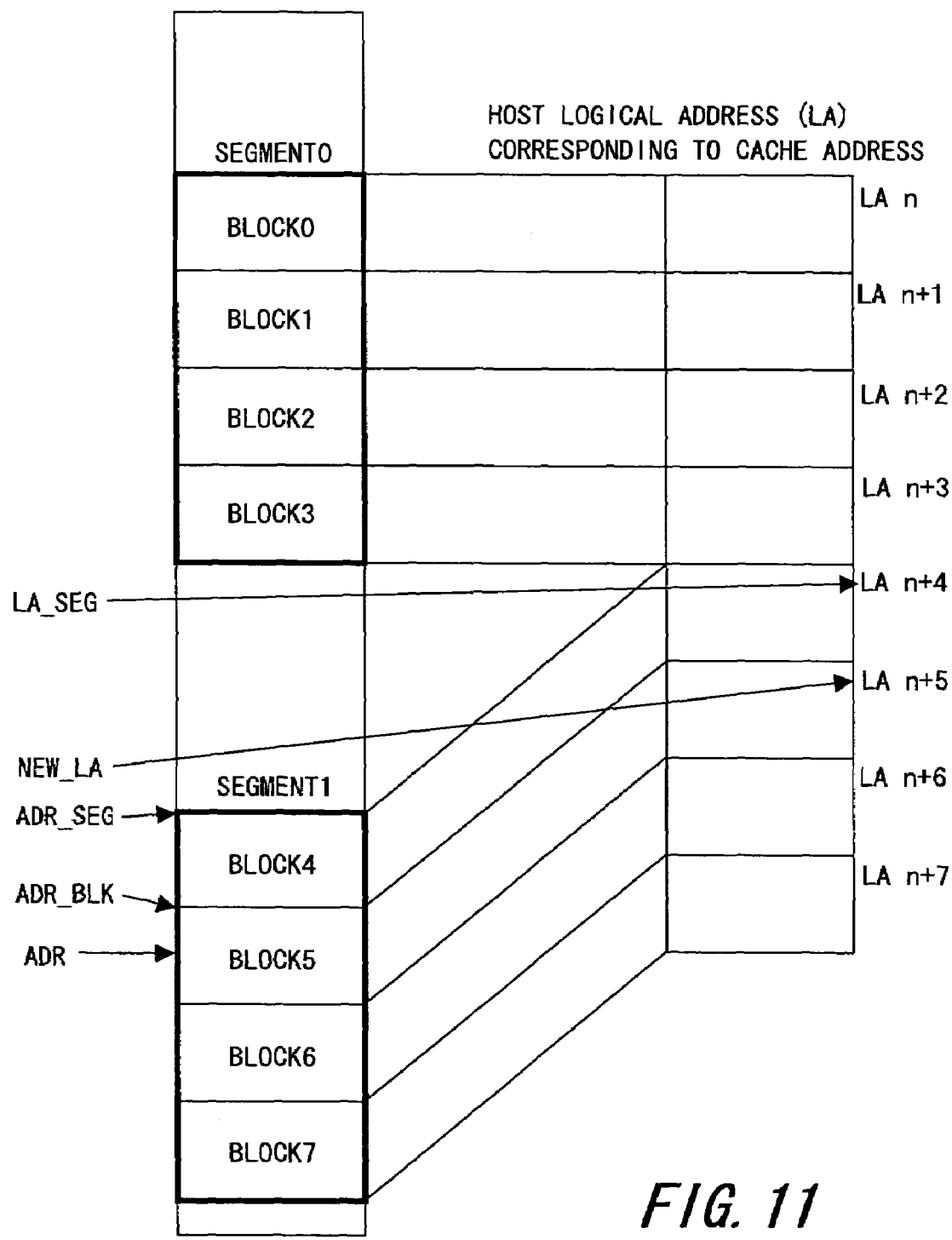
FIG. 11 is an explanatory diagram of LA calculation according to the first embodiment of this invention.

FIG. 11 is an explanatory diagram of the NEW_LA calculation. When the cache address (ADR) exists in a block 5 of a segment 1, the first address of the block 5 is set as a block address (ADR_BLK), the first address of the segment 1 is set as the segment address (ADR_SEG), and the LA of the first block of the segment 1 is set as the segment LA (LA_SEG).

Then, the number of blocks from the first block of the segment 1 is added to the LA of the first block of the segment 1, thereby obtaining the LA ($LA_{n+5}$) of the block 5.

$$LA_{n+5}=((ADR-ADR\_SEG)/512)+LA\_SEG \qquad (2)$$

After the NEW_LA calculation, the processing proceeds to step 1508 in which it is judged whether the cache address is the last address of a block of 512 bytes. When the cache address is the last address of the 512-byte block, the processing proceeds to step 1509 in which the NEW_LA calculated in step 1507 is transferred to the buffer value setting sub-program 1001 as the LA of the block.

Figure 12:
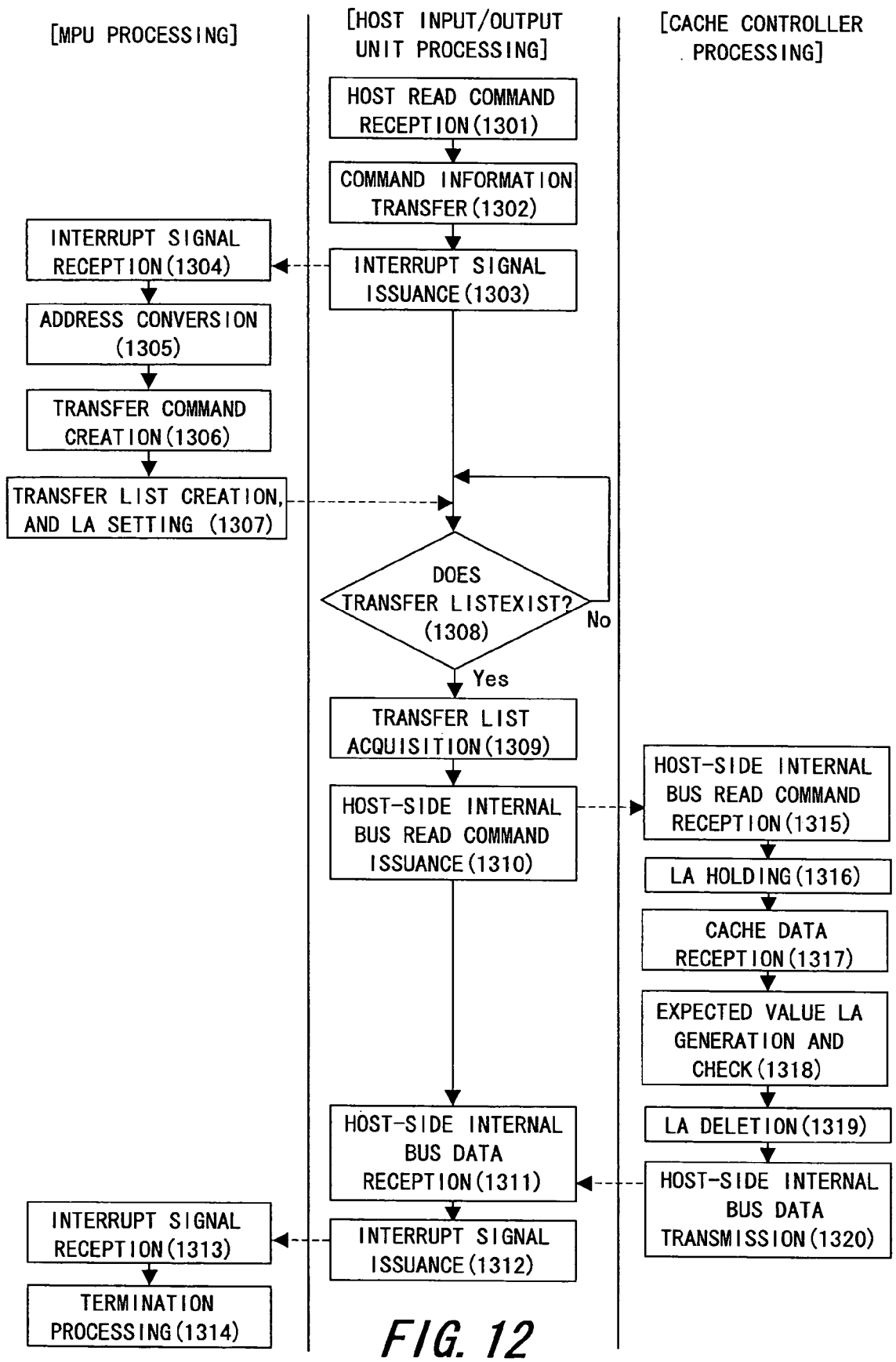
FIG. 12 is a sequential diagram of data transfer processing at the time of disk array read according to the first embodiment of this invention.

FIG. 12 is a sequential diagram of processing for transferring data read from the disk drives into the cache to the host input/output unit in the first embodiment.

First, in step 1301, when a data reading request is issued from the application program executed on the host 101 or the like, the host input/output unit 106 or the like receives the host read command. Then, in step 1302, the host input/output unit 106 or the like transfers the contents of the command to the command information storage unit 130 in the memory 126. Next, in step 1303, in order to have the MPU 125 create a transfer list, the host input/output unit 106 or the like issues an interrupt signal, thereby notifying the command reception.

In step 1304, the MPU 125 receives the interrupt signal. Then, in step 1305, the MPU 125 analyzes the contents of the host read command stored in the command information storage unit 130, extracts logical data block addresses from the command, and performs address conversion that is unique to the disk array where the logical data block addresses are converted into physical data block addresses. Then, in step 1306, the MPU 125 creates a transfer command for reading data from every physical data block address obtained as a result of the conversion. This transfer command is stored in the command information storage unit 130 and is used by the host input/output unit 106 (DMA controller 109). Then, in step 1307, LAs are generated from logical unit numbers and the logical data block addresses and an entry is added to the host-side LA information storage unit 123. Also, in this step, a host-side internal bus transfer list corresponding to every disk drives, from which reading needs to be performed, is created and is stored in the transfer list storage unit 129. Following this, the MPU 125 instructs the host input/output unit 106 to transfer.

After being instructed to transfer by the MPU 125, the host input/output unit 106 reads the transfer list 129 and stores read data corresponding to every entry of the list at specified cache addresses. First, in step 1308, it is judged whether a host-side internal bus transfer list is stored. When a result of this judgment is positive, the processing proceeds to step 1309 in which the host input/output unit 106 acquires the host-side internal bus transfer list from the transfer list storage unit 129 using the DMA controller 109. Following this, in step 1310, a read command with respect to the cache controller 111 is sent out to the host-side internal bus 110. This read command is a transfer command requesting the transfer of data stored in the cache and contains information on the transfer list as PCI addresses.

In step 1315, the cache controller 111 receives the read command (transfer command) from the host input/output unit 106. Then, in step 1316, the cache controller 111 acquires. LAs from the host-side internal bus transfer addresses of the received read command (transfer command) and stores them in the host information holding unit 114. Then, in step 1317, data is received from the cache 122. Next, in step 1318, LAs given to the received cache data are compared with LAs generated using the data held in the host information holding unit 114, thereby checking the LAs of the received cache data.

When the LA check is finished, the processing proceeds to step 1319 in which the LAs are deleted from the received cache data, thereby obtaining data composed of only logical data blocks. Following this, in step 1320, the cache data is transmitted to the host-side internal bus 110.

In step 1311, the host input/output unit 106 receives the cache data and transmits the received data to the host that has transmitted the host read command. Following this, when the data transfer is finished, the processing proceeds to step 1312 in which the host input/output unit 106 issues an interrupt signal to the MPU 125.

On receiving the interrupt signal in step 1313, the MPU 125 performs termination processing in step 1314.

In this manner, at the time of disk array read, when divided data is transferred, a data guarantee code is added to each logical data block and it is monitored that data has been read from each correct address in the cache 122, thereby improving the reliability as a system.

It should be noted that divided data stored in the disk drives group 140 or the like is transmitted from the disk input/output unit 133 to the cache controller 111 based on a transfer list created by the MPU 125 according to a data transfer command issued by the disk input/output unit 133 or the like and is written into the cache 122 as the cache data.

Figure 13:
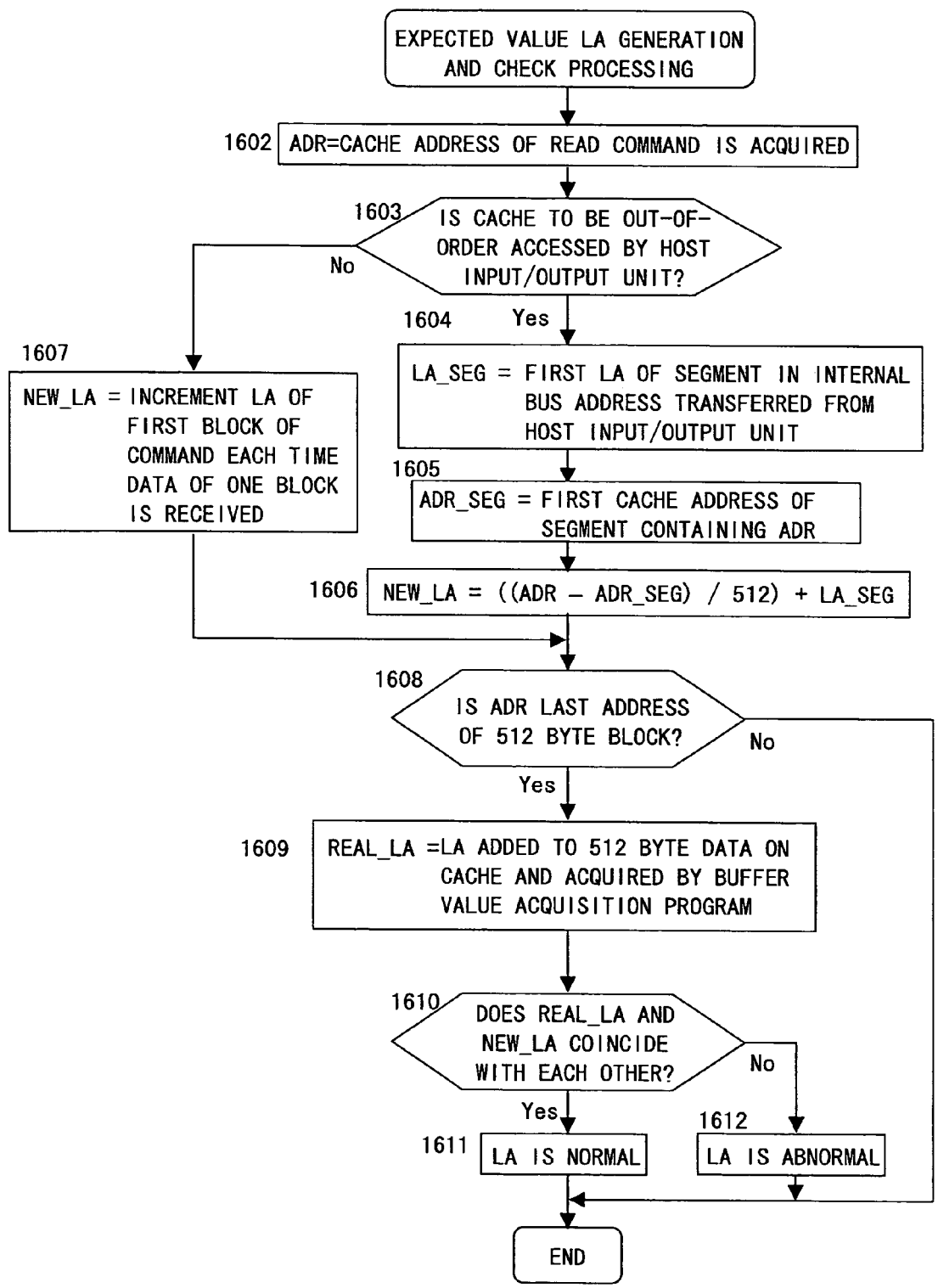
FIG. 13 is a flowchart of expected value LA generation and LA check processing according to the first embodiment of this invention.

FIG. 13 is a flowchart of the expected value LA generation and LA check processing (step 1318 in FIG. 12) in the first embodiment, and shows processing by the LA expected value generation sub-program 1002 of the LA check program A 118.

First, in step 1602, a cache address (ADR) that is a writing target is acquired from a read command.

Following this, in step 1603, it is judged whether the cache is to be out-of-order accessed by the host input/output unit 106. This judgment is made by the host input/output unit identification program 115 based on a communication protocol used by the host input/output unit 106 to perform communication with the host 101. For instance, when the host-side internal bus 110 uses Fibre Channel, it is judged that the out-of-order access will not occur. On the other hand, when iSCSI is used, it is judged that the out-of-order access will occur.

When it is judged in step 1603 that the out-or-order access to the cache will not occur, the processing proceeds to step 1607 in which each time data of one block is received, an LA is generated by adding an address value corresponding to one block to the command first block LA 902 stored in the host information holding unit 114. Then, the processing proceeds to step 1608.

On the other hand, when it is judged in step 1603 that the out-of-order access to the cache will occur, the processing proceeds to step 1604 in which a segment first block LA in an internal bus address transferred from the host input/output unit 106 is set as a segment LA (LA_SEG).

Then, in step 1605, the first cache address of the segment containing the cache address (ADR) is set as a segment address (ADR_SEG).

Next, in step 1606, a result of calculation by equation (3) is set as an LA (NEW_LA).

$$NEW\_LA=((ADR-ADR\_SEG)/512)+LA\_SEG \quad (3)$$

Following this, in step 1608, it is judged whether the cache address is the last address of a block of 512 bytes. When the cache address is the last address of the 512 byte block, the processing proceeds to step 1609 in which the LA added to the 512 byte data and acquired by the buffer value acquisition sub-program 1101 from the cache 122 is set in a variable REAL_LA.

Then, in step 1610, the NEW_LA calculated in step 1606 is compared with the REAL_LA set in step 1609. When the LAs coincide with each other, the processing proceeds to step 1611 in which it is judged that the LA is normal. On the other hand, when the LAs do not coincide with each other, the processing proceeds to step 1612 in which it is judged that the LA is abnormal and an interrupt is issued to the MPU 125 to thereby notify the abnormality.

Next, an effect of the first embodiment will be described.

FIG. 14 is an explanatory diagram of cache access at the time of conventional in-order access. That is, FIG. 14 shows the transfer of data from the cache to the host input/output unit under a state where out-of-order access will not occur.

It should be noted that in this drawing, a case is shown in which one block has a size of 512 bytes and the storage area of one segment is formed by four continuous blocks (2 k bytes). However, one segment may be formed by another number of blocks (32 blocks and 16 k bytes, for instance). Also, a case is shown in which data composed of eight blocks is transferred.

On receiving a data writing request from the host 101, the host input/output unit 106 sends out the amount of writing data extracted from the request to the cache controller 111.

On receiving the amount of the data to be written, the cache controller 111 searches information for managing the cache 122, reserves an area of the cache 122 into which the data is to be written, and transmits the segments (addresses) of the reserved area to the MPU 125. The storage area of the cache 122 is managed in units of segments and thus there are cases where the data sent from the host is stored in discontinuous segments. In this case, the addresses in the cache 122, at which the data is stored, may become discontinuous.

Then, the host input/output unit 106 transfers data received from the host to the cache controller 111 according to a transfer list created by the MPU 125. Then, the cache controller 111 gives data guarantee codes (indicated by hatching in the figure) to the data and stores resultant data in the cache 122.

Also, when receiving a data reading request from the host 101, the host input/output unit 106 sends out logical data block addresses extracted from the request to the cache controller 111.

On receiving the logical data block addresses of data to be read, the cache controller 111 searches information for managing the cache 122 and transmits segments (addresses), in which the data to be read is stored, to the MPU 125. The storage area of the cache 122 is managed in units of segments, so that there are cases where even when the logical data block addresses specified from the host are continuous, the data to be read is stored in discontinuous segments. In this case, the addresses in the cache 122, at which the data to be read is stored, become discontinuous.

Then, the host input/output unit 106 accesses data stored in the cache 122 according to a transfer list created by the MPU 125 and the data is transferred from the cache controller 111 to the host input/output unit 106. The data stored in the cache 122 is given data guarantee codes (indicated by hatching in the figure). At the time of the data transfer shown in this drawing, the host input/output unit reads blocks storing the data that is a reading target in succession in the order of from $LBA_n$ to $LBA_{n+7}$.

As described above, with the conventional configuration where Fibre Channel is used for connection between the host 101 and the host input/output unit 106, the host input/output unit 106 receives data in the order of logical data block addresses. Therefore, even when multiple logical data blocks are transferred in succession, it is possible to calculate correct LAs and to make a precise check by generating LA expected values through LA addition in units of block sizes.

Figure 15:
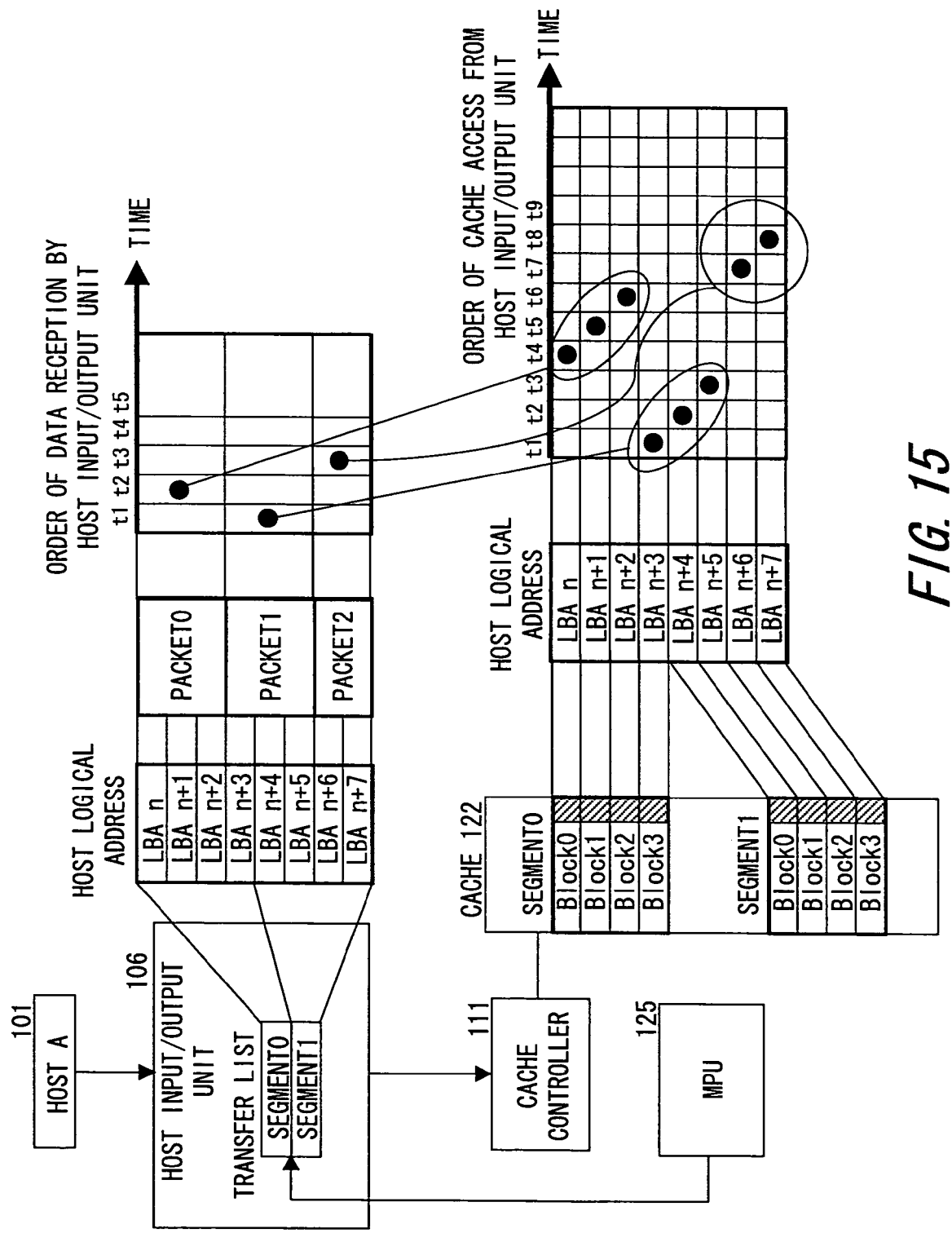
FIG. 15 is an explanatory diagram of cache access at the time of out-of-order write according to the first embodiment of this invention.

FIG. 15 is an explanatory diagram of cache access in the first embodiment under a condition where out-of-order write has occurred.

On receiving a data reading request from the host 101, like in the case of the conventional data transfer described above (see FIG. 14), the host input/output unit 106 accesses data stored in the cache 122 according to a transfer list created by the MPU 125 and the data is transferred from the cache controller 111 to the host input/output unit 106.

Here, the host input/output unit 106 receives data from the host 101 in units of packets instead of in units of blocks. When data is transferred in units of packets that are each formed by data of three blocks as shown in the drawing, for instance, the order in which the host input/output unit 106 receives the packets does not necessarily coincide with the order of logical data block addresses.

However, the host input/output unit 106 acquires the data in the cache in the reception order of the packets. Therefore, when data is received in the order of a packet 1, a packet 0, and a packet 2, the order of access by the host input/output unit 106 becomes as $LBA_{n+3}$ to $LBA_{n+5}$, $LBA_n$ to $LBA_{n+2}$, and then $LBA_{n+6}$ to $LBA_{n+7}$. In this case, when LA expected values are generated through LA addition in units of block sizes during the successive transfer of the multiple logical data blocks, it becomes impossible to calculate correct LAs because the counter values and the addresses, at which the data is to be written, do not coincide with each other, which leads to a situation where data given erroneous LAs is stored in the cache 122. In this case, correct data is judged as erroneous in LA check at the time of data reading.

Figure 16:
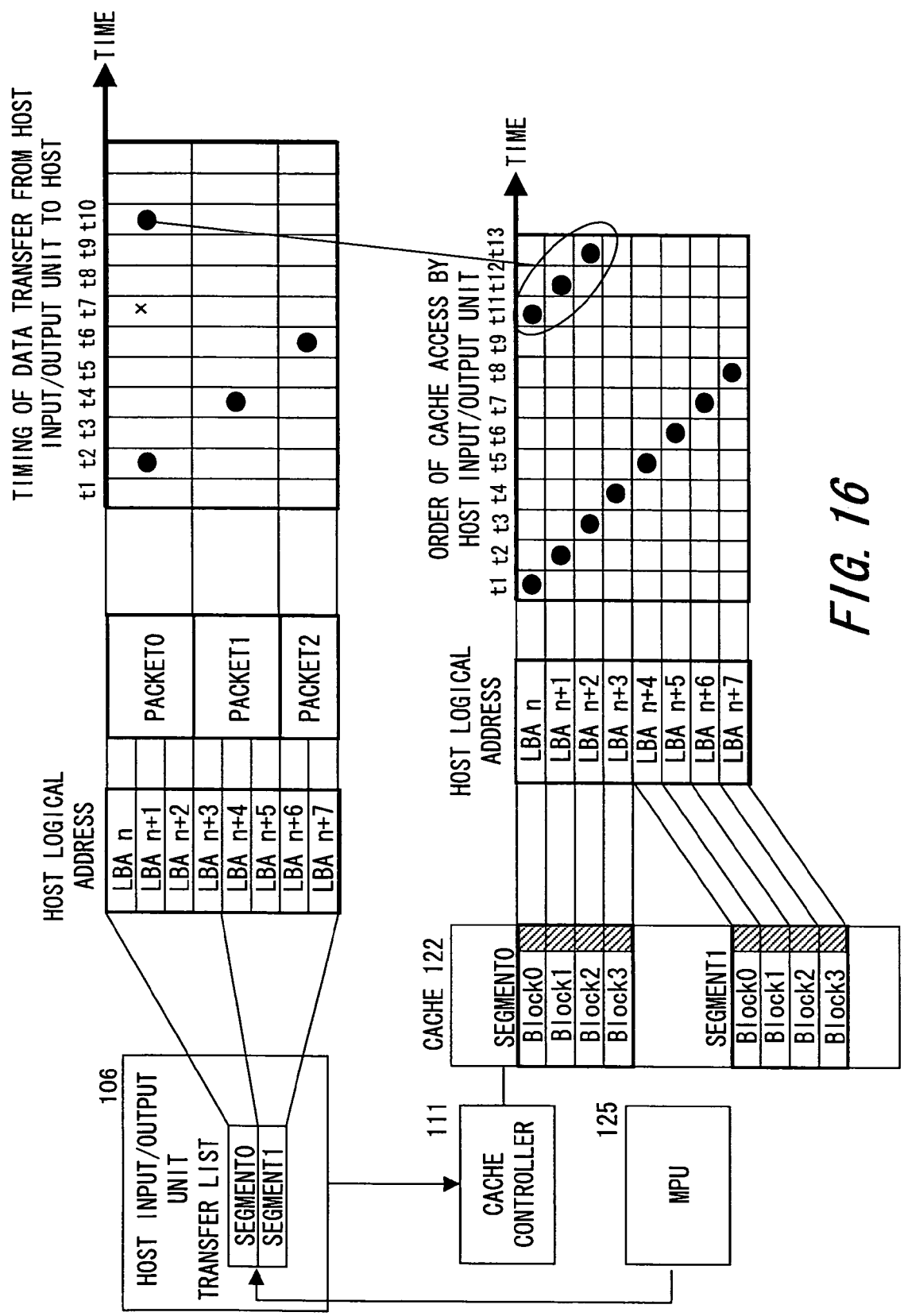
FIG. 16 is an explanatory diagram of cache access at the time of out-of-order read according to the first embodiment of this invention.

FIG. 16 is an explanatory diagram of cache access at the time of out-of-order read in the first embodiment.

On receiving a data reading request from the host 101, like in the case of the conventional data transfer described above (see FIG. 14), the host input/output unit 106 accesses data stored in the cache 122 according to a transfer list created by the MPU 125 and the data is transferred from the cache controller 111 to the host input/output unit 106.

At this time, the host input/output unit 106 transfers the data to the host 101 through a network in units of packets instead of in units of blocks. For instance, the host input/output unit 106 transmits the data in the order of a packet 0, a packet 1, and a packet 2. During this transmission, when the packet 0 is lost on the network (indicated by "x" in the drawing), the host 101 requests the host input/output unit 106 to re-transmit the packet 0. This request to re-transmit the packet 0 is sent to the cache controller 111.

In response to this request, after reading of the data of $LBA_n$ to $LBA_{n+7}$, the cache controller 111 re-reads the data of $LBA_n$ to $LBA_{n+2}$ corresponding to the request to re-transmit the packet 0. At this time, multiple logical data blocks are read in succession. When LA expected values are generated through LA addition in units of block sizes, there occurs a situation where the counter values and the addresses, at which the data is read, do not coincide with each other. Consequently, it becomes impossible to calculate correct LAs at the time of reading of the data of $LBA_n$ to $LBA_{n+2}$ corresponding to the request to re-transmit the packet 0, and data given erroneous LAs is stored in the cache 122. As a result, correct data is judged as erroneous in LA check at the time of data reading.

According to the first embodiment, however, even when out-of-order access occurs like in the cases shown in FIGS. 15 and 16, LA values are obtained using a difference (ADR−ADR_SEG) between a segment address and the first address relating to a transfer command. As a result, it becomes possible to add correct LA values, which makes it possible to make a precise judgment by LA check at the time of data reading.

Second Embodiment

Next, a second embodiment of this invention will be described. This second embodiment differs from the first embodiment described above in the details of the LA generation and addition processing (step 1218 in FIG. 9) and the expected value LA generation and check processing (step 1318 in FIG. 12). Other configurations are the same as those in the first embodiment and therefore the description thereof will be omitted.

Figure 17:
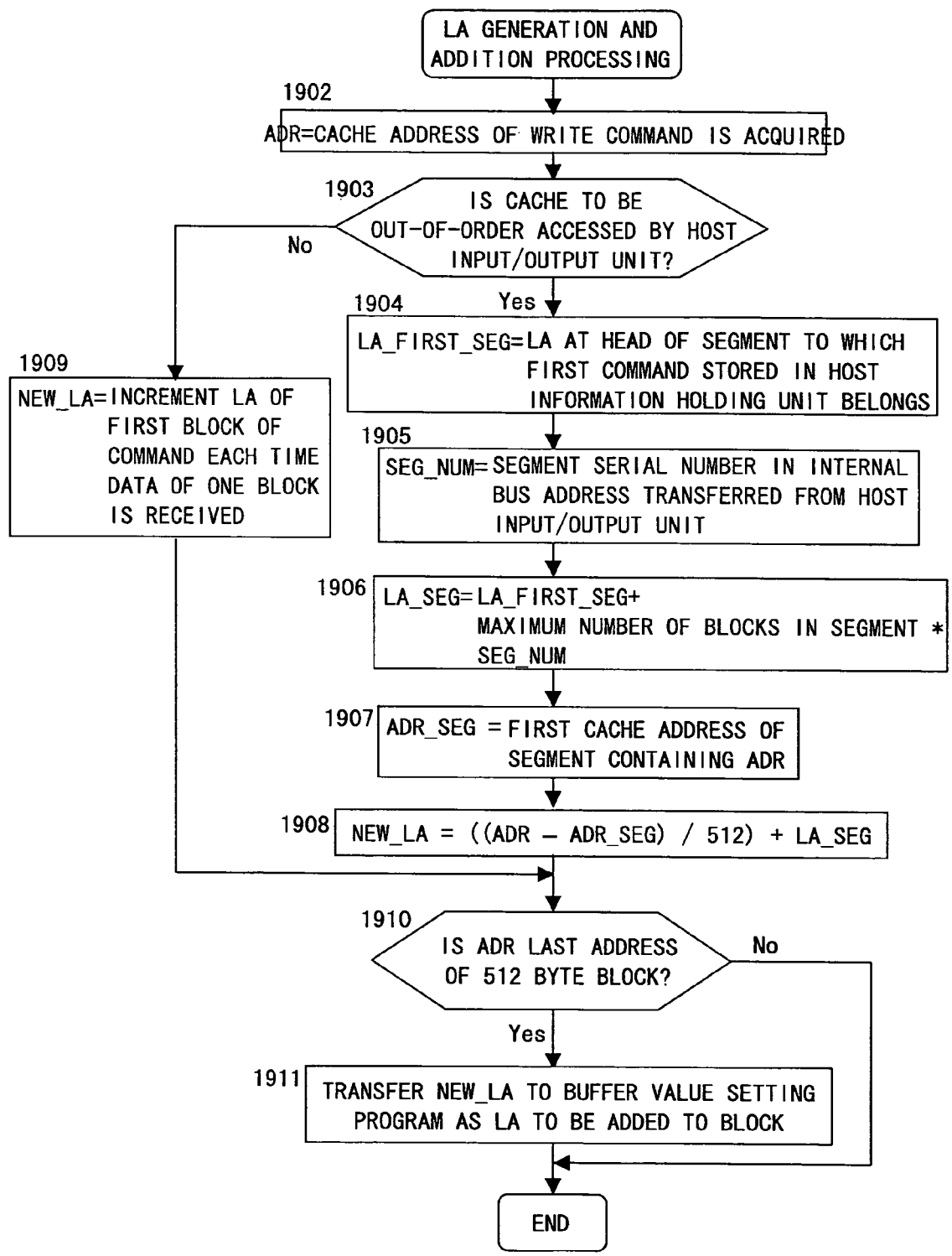
FIG. 17 is a flowchart of LA generation and addition processing according to a second embodiment of this invention.

FIG. 17 is a flowchart of the LA generation and addition processing (step 1218 in FIG. 19) in the second embodiment.

First, in step 1902, a cache address (ADR) that is a writing target is acquired from a write command (transfer command).

Following this, in step 1903, it is judged whether the cache is to be out-of-order accessed by the host input/output unit 106. This judgment is made by the host input/output unit identification program 115 based on a communication protocol used by the host input/output unit 106 to communicate with the host 101, like in the first embodiment described above.

When it is judged in step 1903 that the out-of-order access to the cache will not occur, the processing proceeds to step 1909 in which each time data of one block is received, an LA is generated by adding an address value corresponding to one block to the LA of the first block of the command stored in the host information holding unit. Then, the processing proceeds to step 1910.

On the other hand, when it is judged in step 1903 that the out-of-order access to the cache will occur, the processing proceeds to step 1904 in which the LA (LA_FIRST_SEG) of the first block of a segment, to which the first block of the read command belongs, is acquired from the host information holding unit 114.

Following this, in step 1905, a segment serial number (SEG_NUM) in an internal bus address transferred from the host input/output unit 106 is acquired. In this second embodiment, this segment serial number is stored in the segment information field 703 of the host-side internal bus transfer list (see FIG. 6).

Then, in step 1906, a result of calculation "maximum number of blocks in the segment × segment serial number (SEG_NUM)" is added to the first segment LA (LA_FIRST_ SEG) and a result of this addition is set as a segment LA (LA_SEG).

Next, in step 1907, the first cache address of the segment containing the cache address (ADR) is set as a segment address (ADR_SEG).

Following this, in step 1908, a result of calculation by equation (4) is set as NEW_LA.

$$NEW\_LA=((ADR-ADR\_SEG)/512)+LA\_SEG \quad (4)$$

Figure 18:
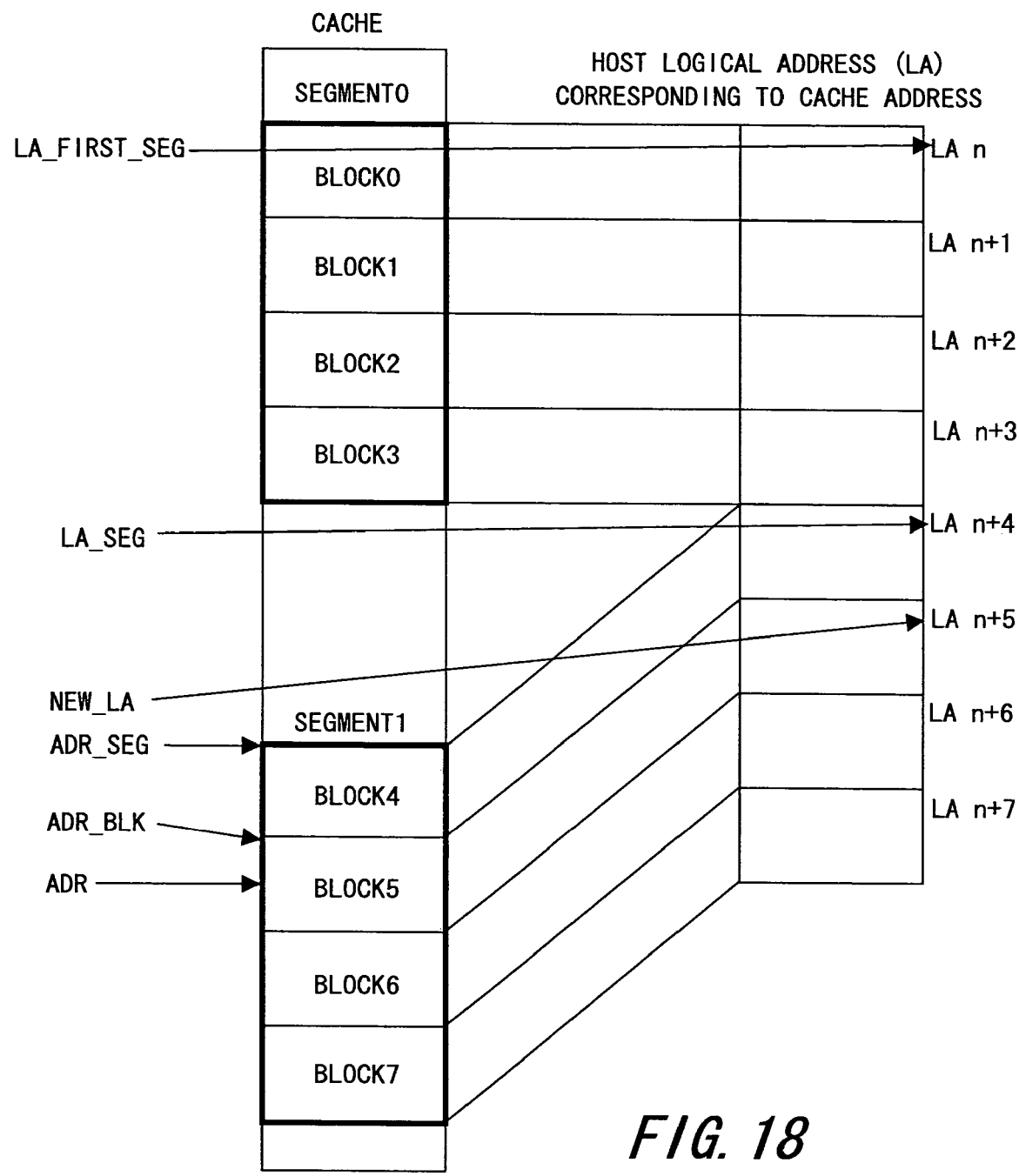
FIG. 18 is an explanatory diagram of LA calculation according to the second embodiment of this invention.

FIG. 18 is an explanatory diagram of the NEW_LA calculation. When the cache address (ADR) exists in a block 5 of a segment 1, the first address of the block 5 is set as a block address (ADR_BLK), the first address of the segment 1 is set as the segment address (ADR_SEG), the LA of a block 0 at the head of a segment 0 is set as the first segment LA (LA_FIRST_SEG), and the first LA of a segment (segment 1) that advances from the first segment (segment 0) by the segment serial number (SEG_NUM) is set as the segment LA (LA_SEG).

Then, the LA ($LA_{n+5}$) of the block 5 is obtained by adding the number of blocks from the first block of the segment to the LA of the first block of the segment.

$$LA_{n+5}=((ADR-ADR\_SEG)/512)+LA\_SEG \quad (5)$$

After the NEW_LA calculation, the processing proceeds to step 1910 in which it is judged whether the cache address is the last address of a block of 512 bytes. When the cache address is the last address of the 512-byte block, the processing proceeds to step 1911 in which the NEW_LA calculated in step 1908 is transferred to the buffer value setting sub-program 1001 as the LA of the block.

Figure 19:
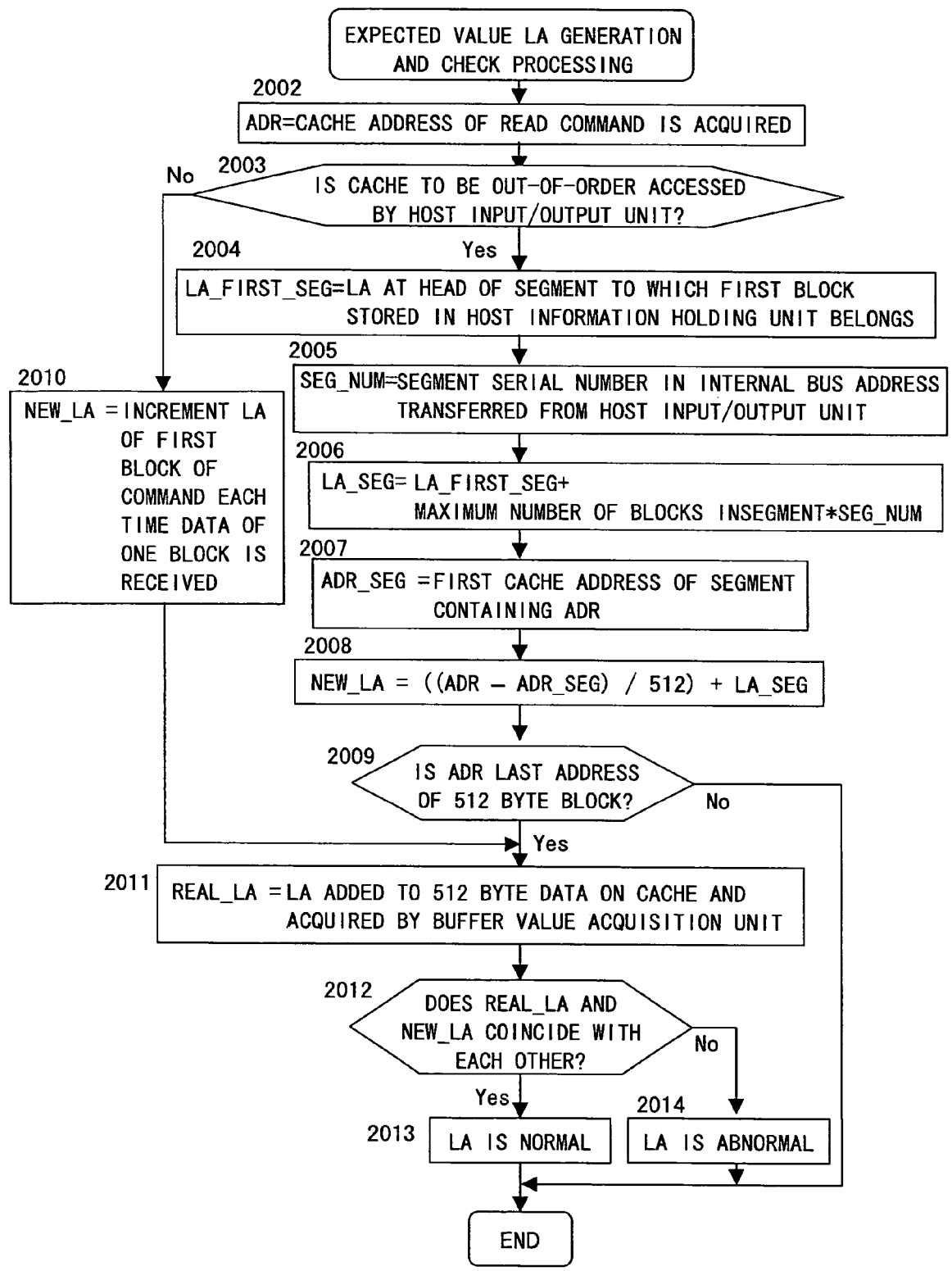
FIG. 19 is a flowchart of expected value LA generation and LA check processing according to the second embodiment of this invention.

FIG. 19 is a flowchart of the expected value LA generation and check processing (step 1318 in FIG. 12) in the second embodiment, and shows processing by the LA expected value generation sub-program 1002 of the LA check program A 118.

First, in step 2002, a cache address (ADR) that is a writing target is acquired from a read command.

Following this, in step 2003, it is judged whether the cache is to be out-of-order accessed by the host input/output unit 106. This judgment is made by the host input/output unit identification program 115 based on a communication protocol used by the host input/output unit 106 to communicate with the host 101, like in the first embodiment described above.

When it is judged in step 2003 that the out-of-order access to the cache will not occur, the processing proceeds to step 2010 in which each time data of one block is received, an LA is generated by adding an address value corresponding to one block to the LA of the first block of the command. Then, the processing proceeds to step 2011.

On the other hand, when it is judged in step 2003 that the out-of-order access to the cache will occur, the processing proceeds to step 2004 in which the LA (LA_FIRST_SEG) of the first block of a segment to which the first block of the read command belongs is acquired from the host information holding unit 114.

Following this, in step 2005, a segment serial number (SEG_NUM) in an internal bus address transferred from the host input/output unit 106 is acquired. In this second embodiment, this segment serial number is stored in the segment information field 703 of the host-side internal bus transfer list (refer to FIG. 6).

Then, in step 2006, a result of calculation "maximum number of blocks in the segment×segment serial number (SEG_NUM)" is added to the first segment LA (LA_FIRST_ SEG) and a result of this addition is set as a segment LA (LA_SEG).

Next, in step 2007, the first cache address of the segment containing the cache address (ADR) is set as a segment address (ADR_SEG).

Following this, in step 2008, a result of calculation by equation (6) is set as NEW_LA.

$$NEW\_LA=((ADR-ADR\_SEG)/512)+LA\_SEG \quad (6)$$

Following this, in step 2009, it is judged whether the cache address is the last address of a block of 512 bytes. When the cache address is the last address of the 512 byte block, the processing proceeds to step 2011 in which the LA added to the 512 byte data and acquired by the buffer value acquisition sub-program 1101 from the cache 122 is set in a variable REAL_LA.

Then, in step 2012, the NEW_LA calculated in step 2008 is compared with the REAL_LA set in step 1610. Next, when the LAs coincide with each other, the processing proceeds to step 2013 in which it is judged that the LA is normal. On the other hand, when the LAs do not coincide with each other, the processing proceeds to step 2014 in which it is judged that the LA is abnormal and an interrupt is issued to the MPU 125 to thereby notify the abnormality.

As described above, according to the second embodiment, even when out-of-order access occurs, LA values are obtained using segment serial numbers (SEG_NUM) from the first block relating to a data access request, so that it becomes possible to add accurate LA values, which makes it possible to make a correct judgment by LA check at the time of data reading.

While the present invention has been described in detail and pictorially in the accompanying drawings, the present invention is not limited to such detail but covers various obvious modifications and equivalent arrangements, which fall within the purview of the appended claims.

What is claimed is:

1. A disk array system, comprising:

a plurality of disk drives on which data is read and written, and a control unit that controls the read and written of the data on the plurality of disk drives based on a data input/output request from a host coupled to the disk array system, wherein the control unit comprises:

a host input/output unit that exchanges the data and a control signal with the host, a disk input/output unit that exchanges the data and a control signal with the plurality of disk drives, a cache memory that temporarily stores the data during transfer between the host input/output unit and the disk input/output unit in units of segments that are each formed by a plurality of blocks having a predetermined size, an MPU that controls an operation of the control unit by executing a control program, and a cache controller that controls input/output of the data into/from the cache memory; and wherein the MPU generates, as information concerning data transfer between the host input/output unit and the cache memory, a host-side internal bus transfer list including an guarantee code (LA_SEG) of a first block of a segment relating to the data transfer, an identifier of the host input/output unit received the data input/output request, an identifier of the data input/output request, and a cache memory address (ADR) relating to the input/output of the data; and the control unit:

(i) calculates guarantee codes for the blocks from the cache memory address (ADR) relating to the input/output of the data, a first cache address (ADR_SEG) of a segment containing the cache memory address (ADR) relating to the input/output of the data, a size of the block (BLK_SIZE), and the guarantee code (LA_SEG) of the first block of the segment relating to the data transfer using the following equation:

$LA=((ADR-ADR\_SEG)/BLK\_SIZE)+LA\_SEG,$ (ii) stores the data added the calculated guarantee codes in the cache memory when the data input/output request from the host is a data input request, and (iii) checks by comparing guarantee codes given to the data read from the cache memory with the calculated guarantee codes when the data input/output request from the host is a data output request.

2. A disk array system, comprising:

a plurality of disk drives on which data is read and written, and a control unit that controls the read and written of the data on the plurality of disk drives based on a data input/output request from a host coupled to the disk array system, wherein the control unit comprises:

a host input/output unit that exchanges the data and a control signal with the host, a disk input/output unit that exchanges the data and a control signal with the plurality of disk drives, a cache memory that temporarily stores the data during transfer between the host input/output unit and the disk input/output unit in units of segments that are each formed by a plurality of blocks having a predetermined size, an MPU that controls an operation of the control unit by executing a control program, and a cache controller that controls input/output of the data into/from the cache memory; wherein the MPU generates, as information concerning data transfer between the host input/output unit and the cache memory, a host-side internal bus transfer list including serial numbers (SEG_NUM) expressing the order of the segments relating to the data transfer, an identifier of the host input/output unit received the data input/output request, an identifier of the data input/output request, and a cache memory address (ADR) relating to the input/output of the data; and wherein the control unit:

(i) calculates guarantee codes for the blocks from the cache memory address (ADR) relating to the input/output of the data, a number of the blocks in the segments (SEG_SIZE), an guarantee code (LA_FIRST_ SEG) of a first block of a first segment relating to the data transfer, the serial numbers (SEG_NUM) of the segments from the first segment relating to the data transfer, and a first cache address (ADR_SEG) of a block containing the cache memory address (ADR) relating to the input/output of the data using the following equations:

$LA\_SEG=LA\_FIRST\_SEG+(SEG\_SIZE \times SEG\_NUM),$ and $LA=((ADR-ADR\_SEG)/SEG\_SIZE)=LA\_SEG,$ (ii) stores the data added the calculated guarantee codes in the cache memory when the data input/output request from the host is a data input request, and (iii) checks by comparing guarantee codes given to the data read from the cache memory with the calculated guarantee codes when the data input/output request from the host is a data output request.

* * * * *